United States Patent [19]
Fischer

[11] Patent Number: 5,502,726
[45] Date of Patent: Mar. 26, 1996

[54] SERIAL LAYERED MEDICAL NETWORK

[75] Inventor: Michael Fischer, San Antonio, Tex.

[73] Assignee: Nellcor Incorporated, Pleasanton, Calif.

[21] Appl. No.: 829,146

[22] Filed: Jan. 31, 1992

[51] Int. Cl.$^6$ .............................. H04J 3/24; H04L 29/02; H04L 12/56

[52] U.S. Cl. .......................................................... 370/94.1

[58] Field of Search .................... 370/94.1, 60, 85.15, 370/58.1, 56, 112, 92, 85.13, 42, 83, 85.6

[56] References Cited

U.S. PATENT DOCUMENTS

| | | | |
|---|---|---|---|
| 4,375,097 | 2/1983 | Ulug | 370/94.1 |
| 4,423,414 | 12/1983 | Bryant et al. | |
| 4,495,493 | 1/1985 | Segarra et al. | |
| 4,549,297 | 10/1985 | Nishimoto | |
| 4,574,284 | 3/1986 | Feldman et al. | |
| 4,603,416 | 7/1986 | Servel et al. | 370/94.1 |
| 4,680,581 | 7/1987 | Kozlik et al. | |
| 4,692,918 | 9/1987 | Elliott et al. | |
| 4,706,080 | 11/1987 | Sincoskie | |
| 4,930,122 | 5/1990 | Takahashi et al. | 370/94.1 |
| 4,941,089 | 7/1990 | Fischer | |
| 4,947,390 | 8/1990 | Sheehy | 370/85.13 |
| 5,007,043 | 4/1991 | van den Dool et al. | 370/94.1 |
| 5,010,546 | 4/1991 | Kato | 370/94.1 |
| 5,050,166 | 9/1991 | Cantoni et al. | 370/61 |
| 5,067,123 | 11/1991 | Hyodo et al. | 370/58.1 |
| 5,113,392 | 5/1992 | Takiyasu et al. | 370/85.15 |
| 5,140,584 | 8/1992 | Suzuki | 370/60 |
| 5,173,897 | 12/1992 | Schrodi et al. | 370/60 |
| 5,214,642 | 5/1993 | Kunimoto et al. | 370/82 |

OTHER PUBLICATIONS

"Internetworking and Addressing", Gene White, Chapt. 5, pp. 101–125, McGraw–Hill, Inc., 1992.

"Architecture of a Comprehensive Radiologic Imaging Network", H. K. Huang et al., IEEE Journal on Selected Areas in Communications, Sep. 1992, vol. 10, No. 7, ISACEM (ISSN 0733–8716).

Primary Examiner—Wellington Chin
Assistant Examiner—Ajit Patel
Attorney, Agent, or Firm—Townsend and Townsend and Crew

[57] ABSTRACT

A network or telemetry system which allows virtual services at the application or presentation layer to communicate with other virtual services without regard to the physical interconnections. Each message, called a parcel, includes the information to be transmitted along with a virtual address header. The parcel is provided to a gateway, which inserts the parcel without modification into a packet with address information for the physical through session layers in the packet header. The packet is then transmitted to another network node, which receives and delivers the unmodified parcel to the addressed destination virtual service. A number of parcels from the same or different virtual services can be packed into a single packet for transmission from the gateway in cases where these parcels are all directed to virtual services at the same destination node. Once a session is established, such as between a gateway and a workstation, virtual services at the gateway node and the workstation can communicate with each other without requiring a lot of header overhead for each transmission. Instead, the session need simply be identified. Each gateway typically has one session at a time, but a workstation can support up to 64 sessions simultaneously.

12 Claims, 8 Drawing Sheets the present invention;

SERIAL LAYERED MEDICAL NETWORK

BACKGROUND OF THE INVENTION

The present invention relates to serial data communication networks, and in particular to networks for interconnecting medical instrumentation.

In a typical computer network, computers are connected together over a communication medium. Each computer has its own, unique physical address which is used for identifying both the source and the destination of any transmission. Data and other information is typically sent in packets, with each packet containing a data field and a header setting forth the source and destination addresses, as well as other information. Different protocols exist for the header and for determining when a particular source can transmit.

In a number of fields, such as the medical field, it is desirable to be able to connect remote instruments to a central computer workstation. Typically, the instruments will gather data and have minimal processing power. The large bulk of data is typically transmitted from the instruments to the computer. In addition to the data, there may be alarm signals which need to be transmitted and immediately received.

It would be desirable to have a system optimized for network communication from a number of medical or other instruments to a central computer.

SUMMARY OF THE INVENTION

The present invention provides a network or telemetry system which allows virtual services at the application or presentation layer to communicate with other virtual services without regard to the physical interconnections. Each message, called a parcel, includes the information to be transmitted along with a virtual address header. The parcel is provided to a gateway, which inserts the parcel without modification into a packet with address information for the physical through session layers in the packet header. The packet is then transmitted to another network node, which receives and delivers the unmodified parcel to the addressed destination virtual service.

A number of parcels from the same or different virtual services can be packed into a single packet for transmission from the gateway in cases where these parcels are all directed to virtual services at the same destination node. Once a session is established, such as between a gateway and a workstation, virtual services at the gateway node and the workstation can communicate with each other without requiring a lot of header overhead for each transmission. Instead, the session need simply be identified. Each gateway typically has one session at a time, but a workstation can support up to 64 sessions simultaneously.

For example, a gateway with a pulse oximeter attached may establish a session with a workstation. The pulse oximeter would provide virtual services for real time data streams for oxygen saturation values, ECG values and pulse values. A separate virtual service called trend service would periodically store real time data for subsequent retrieval. These would communicate with virtual services in the workstation over a single established session. The oxygen saturation and ECG may communicate with a display control virtual service at the workstation, while the pulse value service communicates with an annunciator service at the workstation, for instance. The workstation can simultaneously carry on other sessions with other pulse oximeters or other instruments. A single session may last the duration of a patient's stay in a hospital room.

Unlike the prior art, where separate sessions would typically be needed for transmissions between each pair of virtual services, the present invention supports transmissions between multiple virtual services in a single session. This eliminates the need for each instrument or virtual service to have a large amount of computing power to support its own session. By sharing a session, less overhead in the form of computing power to support communication to and from multiple virtual services is required; while still permitting the virtual services to be unaware of data handling during the communication process.

The parcels can be of varying size and number. Each parcel includes precedence information in the header which indicates the relative delivery importance of the information contained in the parcel. For example, an alarm indication parcel would have a highest precedence level, while real-time data would have lower precedence (with further distinctions between types of data: general data would be higher precedence than detailed data which would be higher precedence than stored data that could be resent if necessary). The gateway transmits the highest precedence level parcels first. If buffer space at the gateway is exhausted, parcels having the lowest precedence level are discarded. If only high precedence parcels are present, older parcels are overwritten with the newer parcels from the same source.

Each virtual service sends parcels to the gateway with precedence information in the parcel header. The parcel header also identifies the length of the information field. The information field can contain data, a command requesting an action, or a reply to a request. If the information field contains data, a sequence number is included indicating the order in which the parcel was generated.

Each gateway has a table for indicating the location of virtual services local to that node and the internal addressing required to deliver parcels to those virtual services. This parcel routing is done transparent to the virtual service itself. The gateway also has a buffer for temporarily storing parcels while they are waiting to be multiplexed into a packet. The packet header identifies the number of parcels included and the overall length of the packet information field containing the parcels. The packet header also contains source and destination handles identifying the physical source node and destination node, as well as the particular session (which is useful for nodes that support a plurality of sessions). A sequence number is included to identify the packet for detection of packets delivered more than once by the physical network hardware.

The present invention detects missing data at the application layer for each service. This is done with the assumption that there is a reliable physical/MAC layer underneath. In this context, "reliable" means that the physical and MAC layers are (when communication is possible) incapable of indicating packet delivery without the packet having successfully reached the destination node (at the MAC layer). In order to do this, the MAC layer, by necessity, is capable of delivering the same packet twice.

For fuller understanding of the nature and advantages of the invention, reference should be made to the ensuing detailed description taken in conjunction with the accompanying drawings.

DESCRIPTION OF THE PREFERRED EMBODIMENT

Figure 1:
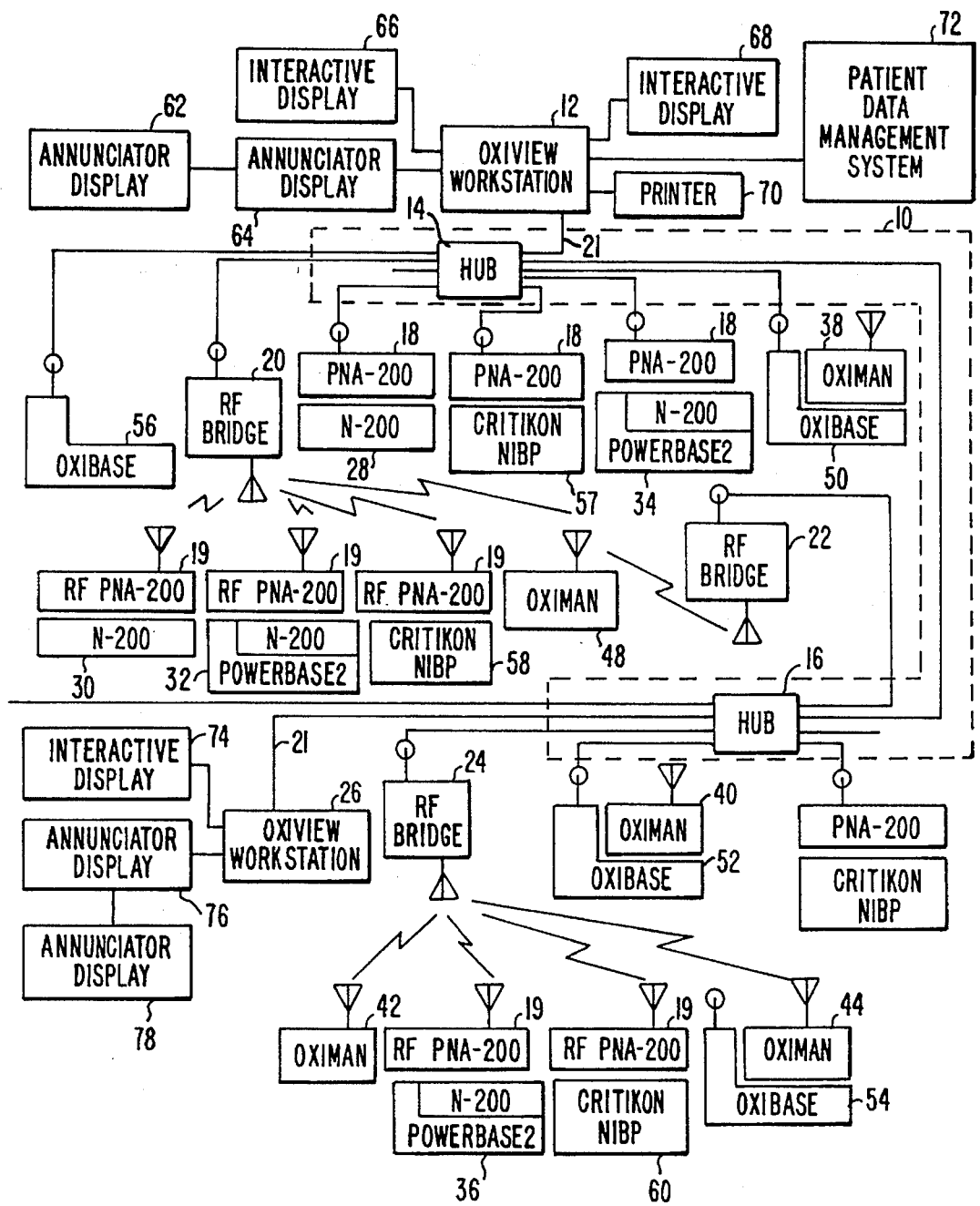
FIG. 1 is a block diagram of a system using a protocol according to the present invention.

FIG. 1 is a block diagram of one embodiment of a system using the protocol of the present invention. An Oxinet2 network 10 connects workstations 12 and 26 to a large number of medical instruments. The network is physically configured, for wiring convenience and other reasons, as a number of lines which are physically interconnected through hubs 14 and 16. Communication over network 10 is controlled by gateways connected to each node. Each of workstations 12 and 26 includes an internal intelligent network adapter (INA) which acts as a gateway. Each of the other instruments connected to the network either contains its own internal gateway or is connected through a gateway called a peripheral network adapter (PNA) 18. A number of instruments are connected to the network through a radio frequency link that operates between radio-equipped gateways 19 and radio frequency (RF) bridges 20, 22 and 24 that serve as radio hubs and connect the RF network to the wired network.

Among the instruments shown in FIG. 1 are pulse oximeters 28 and 30. Other pulse oximeters 32, 34 and 36 include a power base with wave form display and printer capabilities. Personal monitors 38, 40, 42 and 44 monitor heart rate, respiration, oxygen saturation and ECG waveforms. Monitors 38, 40 and 44 include a base unit 50, 52, 54, respectively, which provides a bedside waveform display capability. A display 56 is shown separately hooked up to hub 14. Also shown are blood pressure monitors 57, 58 and 60. The PNA gateway devices 18 and RF PNA gateway devices 19 allow older, existing instruments out in the field to be adapted for communication over the network of the present invention.

Each workstation has other elements coupled to it. Work station 12 has a pair of annnunciator displays 62 and 64, a pair of interactive displays 66 and 68, a printer 70, and is coupled to a hospital's patient data management system 72. Workstation 26 is connected to a single interactive display 74 and a pair of annnunciator displays 76 and 78. Annunciator displays only present alert conditions. The interactive displays permit a user to request the display of alerts, status, data, trends and waveforms.

Figure 2:
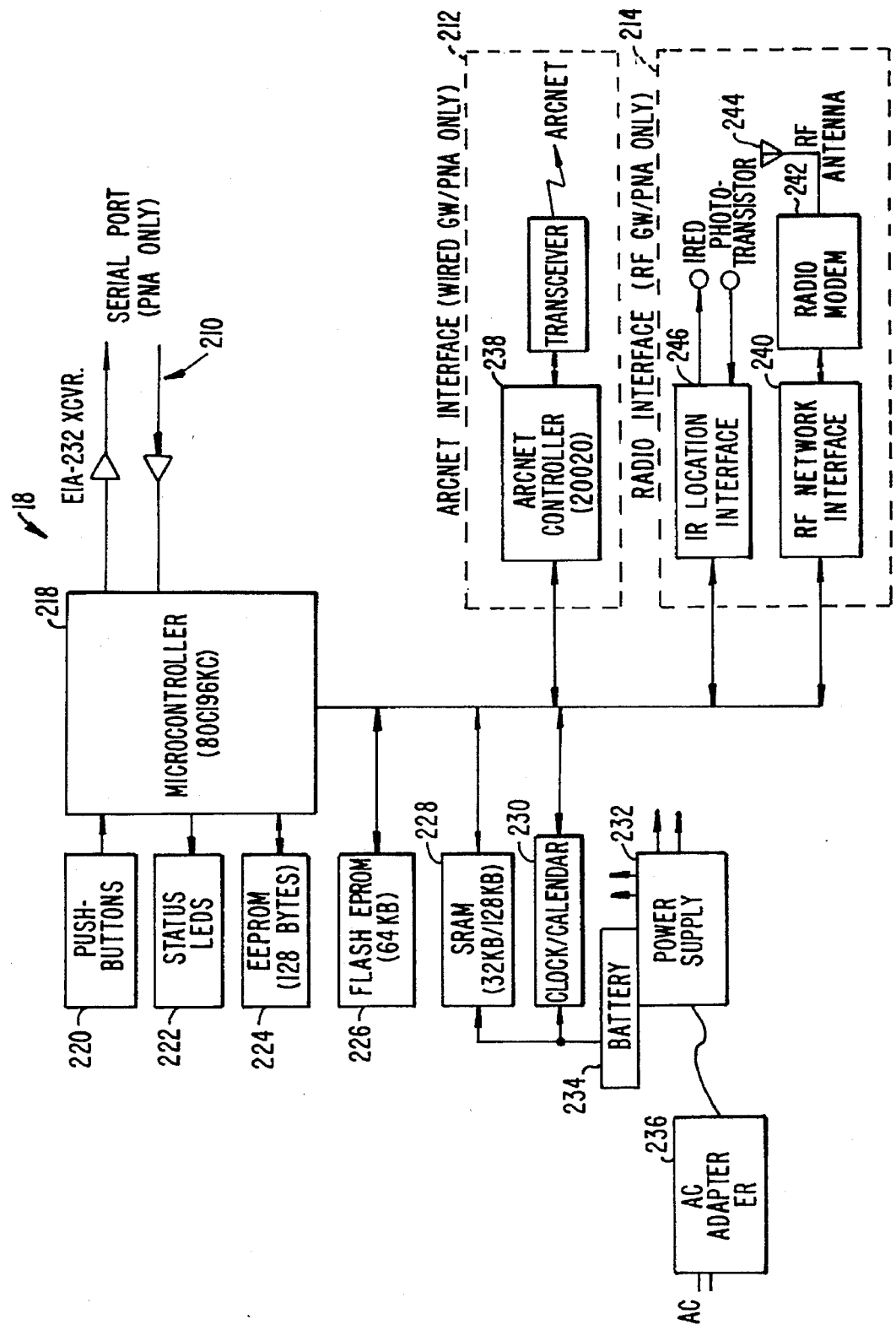
FIG. 2 is a block diagram of a peripheral network adaptor (PNA) of FIG. 1.

FIG. 2 is a block diagram of a peripheral network adapter or gateway 18 or 19 of FIG. 1. The connection to its associated instrument is through a serial port 210. The connection to the network is through a network interface 212 for wired gateways 18 or a radio interface 214 for RF gateways 19.

The PNA has a microcontroller 218 which is connected to push buttons 220, status LEDs 222, and EEPROM memory 224 that is used to store configuration parameters. A separate flash EPROM memory 226 is used to hold operating firmware. An SRAM memory 228 acts as the buffer for the PNA, storing parcels which are assembled into packets and holding trend data for up to 24 hours for readout by the workstation upon request. The PNA also includes a clock/calendar circuit 230, and a power supply 232 with a connection to an external AC adapter 236. A battery 234 is used to maintain the contents of the clock/calender and SRAM circuits for at least 24 hours without AC power.

For a wired connection to the network, a separate ARC-NET controller circuit 238 handles the network transmissions, implementing the ARCNET MAC layer. "ARCNET" is a registered trademark of Datapoint Corp. ARCNET is a widely used LAN described in the ARCNET Designers Handbook, Datapoint Corporation, 2nd Ed., 1988, order no. 61610. ARCNET is also covered by a proposed ANSI Standard, draft rev. 1.6, 1-5-91, available from the ARCNET Trade Association, 3365 North Arlington Heights Road, Suite J, Arlington Heights, Ill. 60004.

Microcontroller 218 controls the assembling of parcels into packets for transmission. If a radio interface is used, RF network interface 240, radio modem 42, and RF antenna 244 transmit to a RF bridge as shown in FIG. 1. The RF bridge contains a microcontroller similar to microcontroller 218 and an ARCNET controller similar to controller 238. Also shown in the radio interface 214 is an infrared location interface 246. This is used to receive signals from an infrared transmitter in a hospital room to indicate the location of the instrument.

PNA microcontroller 218 acquires data from an instrument over EIA- 232 link 210. The link is configured to be in a mode compatible with the link of the instrument. A peripheral transaction server (PTS) in microcontroller 218 is programmed to receive data from the instrument. The data acquired from the instrument is stored in a circular buffer in the microcontroller where the raw instrument data is assembled and routed to a buffer position in SRAM 228. EEPROM 224 is a configuration memory which holds session and initialization parameters. The PNA microcontroller executes firmware stored in flash EPROM 226 that includes functions that translate instrument-specific data formats into the uniform parcel formats used by the workstations. This firmware also maintains a record of actual sensor data each 10 seconds in a special area of SRAM 228 allocated for such trend storage, and permits these trends, extending back up to 24 hours, to be read out by the workstation.

Figure 3:
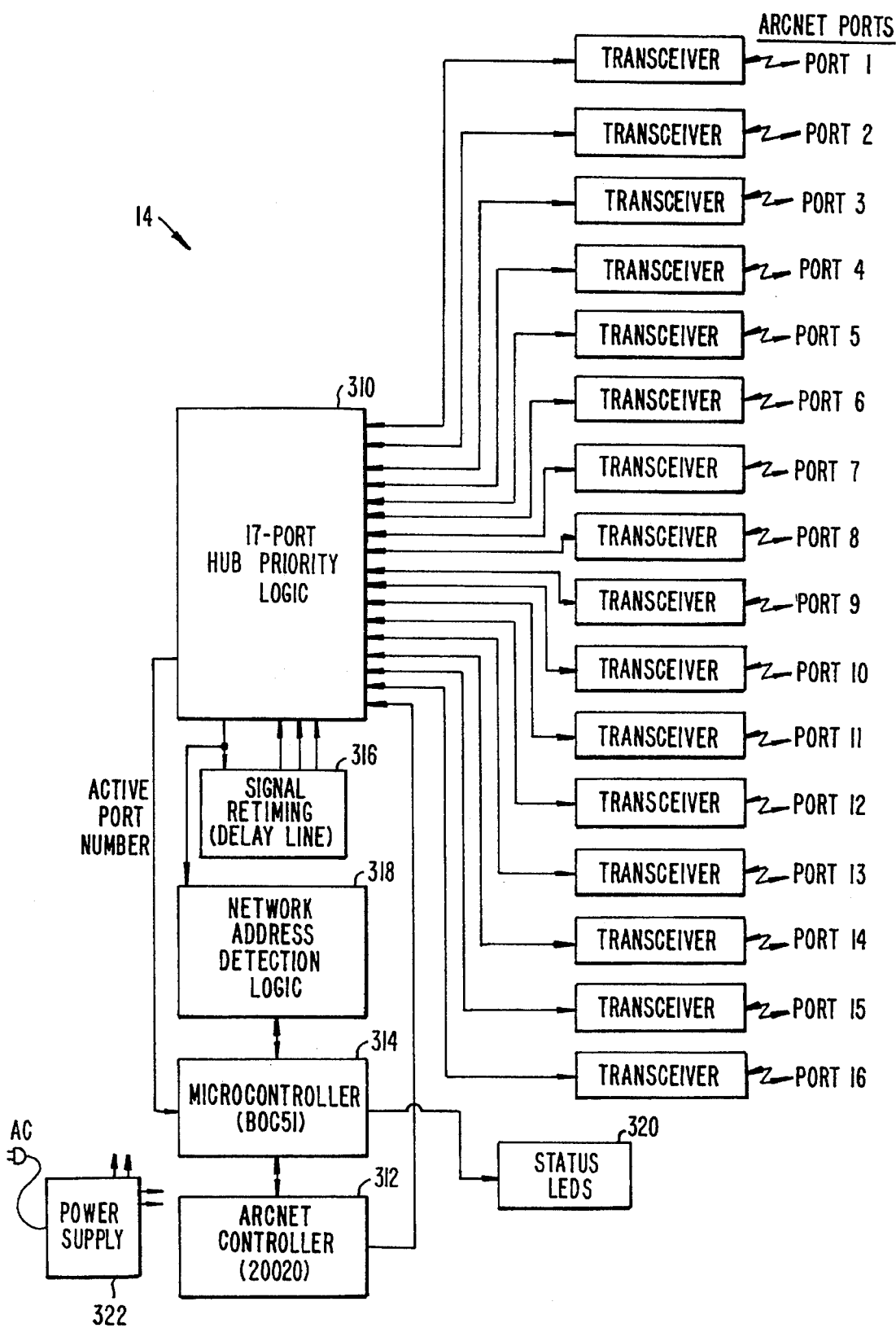
FIG. 3 is a block diagram of a hub of FIG. 1.

FIG. 3 is a block diagram of hub 14 of FIG. 1. The network connections are made through the transceivers for ports 1–16 as shown on the right side of the figure. These ports connect to the workstations and the various instruments and PNAs as shown in FIG. 1. A logic block 310 interconnects the lines depending upon who is transmitting to whom. The logic is controlled by an ARCNET controller 312 and a separate microcontroller 314. There is also provided a signal retiming (delay line) logic 316 and network address detection logic 318. Status LEDs 320 are also provided, along with a power supply 322. The hub listens for transmissions from the different ports. When a transmission is detected, the hub will receive on that port and re-transmit on the remaining ports.

Figure 4:
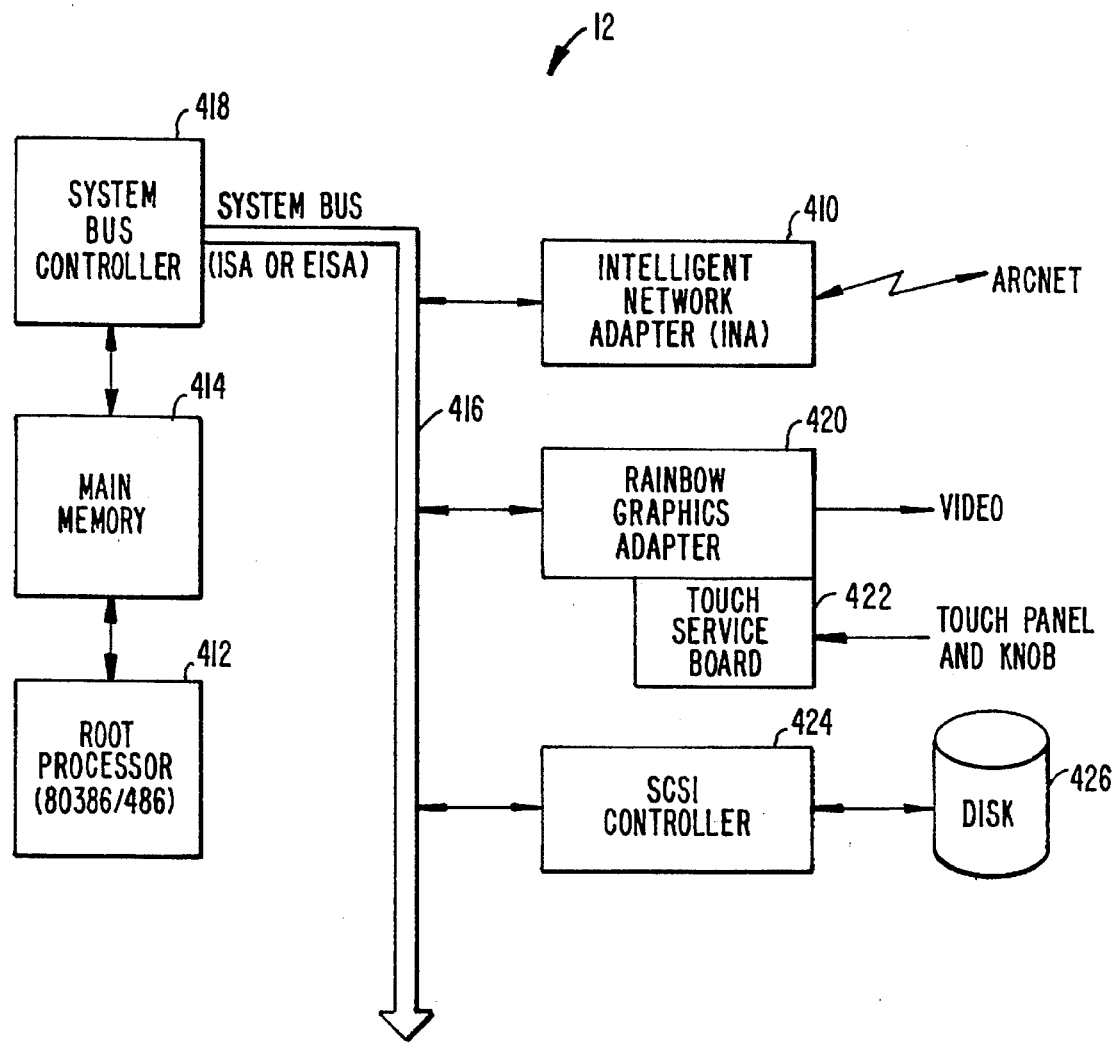
FIG. 4 is a block diagram of a workstation of FIG. 1.

FIG. 4 is a block diagram of a workstation 12 of FIG. 1. The connection to the ARCNET network 10 is through a intelligent network adapter (INA) 410. The workstation is operated under the control of a main, root processor 412 with main memory 414. An internal bus 416 interconnects the elements under the control of a system bus controller 418. A graphics adapter 420 provides data to a video display or a touch services board 422. An SCSI controller 424 provides an interface to disk memory 426. Different virtual services in workstation 12 communicate with virtual counterparts in the instruments attached to the network using the protocol of this invention. An example of a virtual service is a program running on the workstation that performs a particular function.

Figure 5:
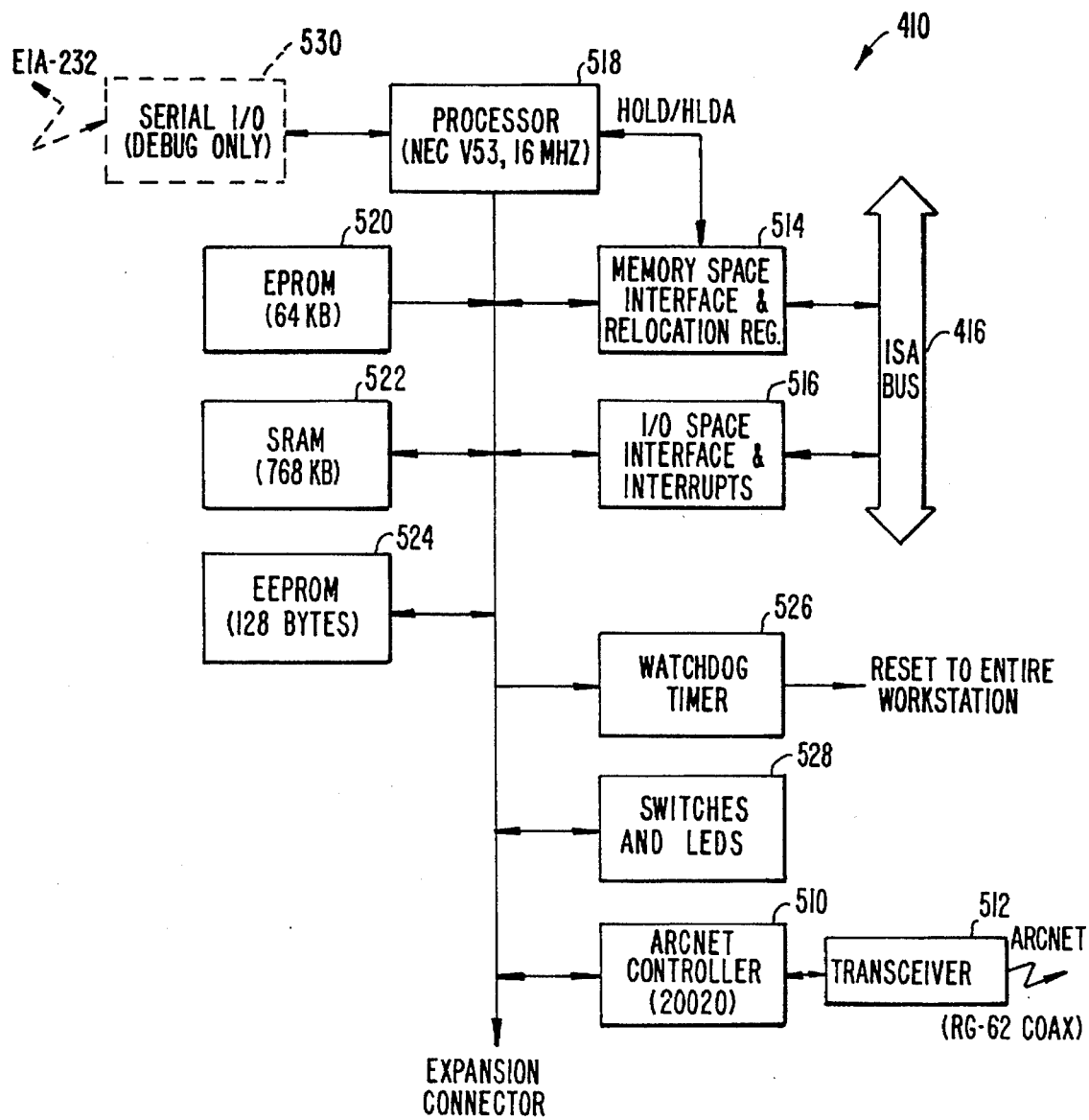
FIG. 5 is a block diagram of the intelligent network adapter (INA) of FIG. 4.

FIG. 5 is a block diagram of the INA 410 of FIG. 4. The connection to the network is through an ARCNET controller 510 and transceiver 512. The connection to the internal bus 416 of the workstation is through a memory space interface and relocation register 514 and an I/O space interface 516. The INA operates under the control of its own processor 518, and includes EPROM memory 520, SRAM memory 522, and EEPROM memory 524. Also included is a watchdog timer 526, switches and LEDs 528 and an optional serial interface 530 for debug purposes. INA 410 acts as the gateway for workstation 12, assembing parcels into packets for transmission, and deassembling received packets.

Transmissions primarily take place from the instruments to the workstation, and from the workstation to the instruments. An instrument sending data or other information transmits a parcel to its associated gateway. The gateway receives several parcels from various instruments or the same instrument and packs them into a packet in the order of arrival. If more parcels arrive between packet transmission opportunities than will fit into a packet, precedence is used to cause the most important parcels to be packed into packets first. The packet is then transmitted to the remote workstation as discussed in detail below. The instrument need only provide the virtual service address of the application layer program in the workstation, with the intermediate levels through physical layer transmission being taken care of by the gateway and the network.

The gateway will examine the precedence information in the parcels it receives and send alarms from its associated instruments first, in accordance with the precedence rules discussed below. The parcels awaiting transmission in the gateway's buffer are overwritten in accordance with the precedence rules in the event of buffer exhaustion. This prevents a real time data waveform from preventing an alarm from getting through, for instance.

1. Definitions

The meanings of some terms used are defined below. Terms being defined are presented in bold, while the first references to terms whose definitions appear subsequent to their initial usage are presented in italics.

Oxinet2 is the name of a network using the protocol of the present invention.

The Oxinet2 protocol is a definition of communication over Oxinet2 networks.

An Oxinet2 network is a set of entities communicating among each other, via a serial interconnection medium, using packets conforming to the Oxinet2 network protocol.

The elements that use the Oxinet2 network communication facilities are services, which are application layer entities that exchange parcels with other services.

Each Oxinet2 network is comprised of one or more segments, which are subsets of the network that communicate via a single instance of a particular link layer facility. Examples of link layer facilities currently used for Oxinet2 segments are ARCNET (a registered trademark of Datapoint Corporation), used to provide 2.5 Mbps of raw transfer bandwidth over coaxial cable to locations where wired interconnection is available, and the Oxinet2 RF network, used to provide a spread-spectrum radio link to mobile devices and/or locations where wired interconnection is not available.

Each segment using the Oxinet2 RF network operates on a particular channel, which is a subset of the available portion of the RF spectrum, using a particular frequency range and spreading sequence, to offer 200 Kbps of raw data transfer bandwidth.

Communication between Oxinet2 network segments takes place through bridges, which are clusters that forward packets between network segments, performing any necessary buffering and conversion of frame formats. Bridges direct packets according to mutes, that associate network-specific addresses on each network segment attached to the bridge with the unique station ID in the packet header.

One type of bridge used for Oxinet2 networks is an RF bridge, which forwards packets between an ARCNET segment and an RF channel that constitutes an Oxinet2 RF network segment.

The session administrator (SA) is a service facility, typically implemented in software on an Oxiview workstation, that receives requests to initiate communication activities;

determines whether to create sessions in response to these requests, determines whether each new session is a reconnection of a preexisting session, and provides the necessary information to permit bridges to determine the appropriate route for the communication activity.

Communication between Oxinet2 networks takes place through gateways, which are stations that forward parcels between the network and virtual services, performing any necessary multiplexing and demultiplexing functions.

The basic addressable units on a Oxinet2 network are stations, each of which are uniquely-identified physical entities from among all manufactured equipment which may be attached to, and exchange information over, an Oxinet2 network.

One or more physically connected stations constitute a cluster, which is a component, or a set of interconnected components, attached to an Oxinet2 network. Examples of clusters include Oxiview workstations (including their attached peripheral devices), each of which is a single station;

PNA-200 peripheral network adapters (including their attached peripheral devices).

The term local refers to facilities or services which are internal to the entity of reference (typically a cluster), whereas remote refers to facilities, services, or entities which are external to the entity of reference.

Satellite refers to PNA-200s in contrast to Oxiview workstations and RF Bridges. For example a satellite RF station, is a station with a transceiver for the Oxinet2 RF network. The satellite RF station is remote from the reference points of Oxiview workstations and RF bridges.

The implementation of network facilities is described in terms of a sequence of seven, hierarchical layers. From top to bottom these are the:

application layer, which implements the user-accessible functionality of the workstation, instrument, or peripheral device;

presentation layer, which provides an application programming interface (API) between application layer software and the lower layers implementing the Oxinet2 protocol;

session layer, which performs parcel multiplexing and demultiplexing functions on network stations;

transport layer, which consists of transmitter and receiver control state machines for each half-session on network stations;

network layer, which provides routing and session establishment services on network stations;

link layer, which is generally subdivided into the logical link control (LLC) layer (sometimes termed a "sub-layer"), which is functionally null on Oxinet2 networks, and media access control (MAC) layer (sometimes termed a "sublayer"), which concerns arbitration, framing, flow control, and acknowledgement of transfers over a particular medium; and physical layer, which concerns details of the particular media (ARCNET, Oxinet2 RF network).

Each instance of communication on an Oxinet2 network involves sending a packet, which consists of an Oxinet2 header, that holds network, transport, and session layer control information for the Oxinet2 network protocol; and an Oxinet2 information field, that carries the data stream being communicated between presentation layer entities by the Oxinet2 network protocol.

The Oxinet2 information field of each packet may contain one or more parcels.

A transmission opportunity is a point in time when a station is permitted to transmit a packet over a network segment according to the MAC layer protocol for that network segment. For ARCNET, transmission opportunities occur at least once every 50 ms, whereas for the Oxinet2 RF network, transmission opportunities can be separated by up to 1 second.

Each instance of communication between virtual services on the Oxinet2 network involves sending a parcel, which is the lowest level data structure exchanged between application layer services. Parcels consist of a parcel header, that holds presentation layer control information pertaining to the parcel; and a parcel information field, that carries the data being transported between application layer entities by this parcel.

the precedence of a parcel refers to one of four levels of relative priority for use in ordering the transmission of parcels over the network, and the selective discarding of parcels awaiting multiplexing for network transmission (by gateways) if buffer space is unavailable.

Subject to availability of space in the Oxinet2 packet information field, multiple parcels may be transferred in a single packet; however, single parcels are never split across packet boundaries.

There are three logical types of parcels:

request parcels, that are specific demands for which a subsequent reply parcel is expected;

reply parcels that are sent strictly in response to a predecessor request parcel; and data parcels, that transfer data and/or state information at periodic time intervals or upon the occurrence of particular, aperiodic events.

For example, a request parcel is sent from a PNA-200 to the session administrator service on an Oxiview workstation in order to establish a session. When the session is established, a reply parcel is sent from the session administrator to the satellite PNA-200.

Within each station, parcels are transferred through the parcel hole, which is a presentation layer abstraction that accepts parcels for transmission from the application layer, and provides received parcels and network status to the application layer.

For actual transmission over any particular MAC layer, each packet or parcel is encapsulated in a frame, that surrounds the packet or parcel with framing information in the form of the physical and link layer header and trailer fields required by the particular network being used.

Communication of Oxinet2 packets takes place between (session) partners, that are stations capable of serving as one end of a full-duplex communication activity known as a session. Each session is a point-to-point, full-duplex virtual circuit established between a pair of Oxinet2 partners. Except in the case of an Oxiview workstation, there is never more than one session active at any cluster, independent of the number of stations that constitute the cluster or are attached to the network.

The action that establishes a session is a connect. A connect request (CONN_REQ) is sent from the active gateway of a PNA-200 to an Oxiview workstation, where session initialization activities take place before returning a connect reply (CONN_REP) to the requester.

The term half-session is sometimes used to refer to one of the two, simplex communication paths that comprise a session. Each half-session is controlled by a pair of state machines, one controlling the transmitter and one controlling the receiver.

Communication within an Oxinet2 session takes the form of a data stream, which is a sequence of parcels accepted from the presentation layer at the transmitting end and delivered to the presentation layer at the receiving end, unmodified, other than possible discarding of entire parcels in cases of inadequate buffer space; and in the order received, other than possible delivery of higher-precedence parcels ahead of lower-precedence parcels.

Packing of the parcels into packets for transmission, and the subsequent unpacking upon reception, is transparent to the users of the data stream. The order of parcels through the data stream is strictly maintained in the order that they are supplied to the session layer by the presentation layer. There are no reserved codes nor reserved data sizes, other than an upper bound on the length of each parcel. The contents of Oxinet2 data streams are totally arbitrary as viewed from the presentation layer.

A goal of Oxinet2 network communication is to minimize the observable delay, which is the time between a user's perception of the occurrence of an event (such as an alarm condition) at a satellite monitor and the reporting of the occurrence of that same event to a care provider at the connected workstation.

Each Oxinet2 service is identified by a service name, that is assigned globally.

Communication between services is directed using a three-component address that consists of a destination tag (DTAG), recipient service ID (RID), and action code (ACT).

The 8-bit tag identifies an instrument, workstation, or bridge. Both a source tag (STAG) and a destination tag (DTAG) are included in each parcel. Tag values are assigned globally.

The 8-bit service ID is a virtual label that uniquely identifies a particular service within the context of the module identified by the associated tag. Both an originator service ID (OID) and a recipient service ID (RID) are included in each parcel. with the exception of a few globally-assigned service IDs, the service ID values are assigned dynamically by the session manager whenever a satellite cluster is initialized.

The 16-bit action code (ACT) uniquely identifies the action to be performed by the recipient of the parcel, and is used, within the recipient module to direct the parcel to the task appropriate for the designated action.

A partner is identified by a 32-bit handle, which is a globally unique identifier value. The handle is subdivided into a 24-bit station ID (STID), which uniquely identifies the station at which the partner exists; and an 8-bit session number (SSN), assigned uniquely by the Oxinet2 network layer at the designated station.

In the case of multi-station clusters, the station ID in the handles used for session communication to and from that cluster identifies the station serving as the session manager for the cluster.

In terms of facilities provided by the Oxinet2 protocol, a workstation is a single station as far as any satellite station is concerned.

The station ID consists of an 8-bit station type (STP), which identifies the kind of station and a 16-bit serial number (SRL), unique within each station type value. More than one station type value may be assigned for a single kind of station if the range of serial numbers for that kind of station is expected to exceed 64K. Zero is not a permissible value for a serial number.

In the case of multi-station, modular instruments, multiple station Ids exist, one for each internal module.

The station ID in the handles used for session communication to and from the instrument identifies the gateway module of that instrument.

An 8-bit instrument type (ITP) is maintained on the module that provides user interface (UIF) service for the instrument. In order to allow instrument type values to directly be used as instrument tag values, instrument types are restricted to values between 1 and 223, inclusive.

The instrument ID (IID) is the 32-bit value obtained by concatenating the instrument type with the station ID of the module that provides user interface service for the instrument. The instrument ID may be used to uniquely identify an instrument for all short-duration activities, including the determination by a workstation that the same instrument has reconnected via a different gateway. However, the instrument ID may be altered during repair of the instrument, so long-duration activities, such as physical asset tracking, should be done using the serial number recorded on the instrument enclosure, not the instrument ID.

With respect to any parcel or packet transferred between stations, the source is the station at which the parcel is transferred from the presentation layer, or the packet is transferred from the transport layer, to lower-layer facilities. While the destination is the station at which the parcel is transferred to the presentation layer, or the packet is transferred to the transport layer, from lower-layer facilities.

There is only one source and one destination for each parcel or packet, independent of the number of intermediate stations, such as bridges or gateways, through which the parcel or packet passes enroute.

In the presence of bridges and/or gateways, there is an important distinction between the source and destination, which are distinguished by operations that occur at, or above, the transport layer; and the transfer facilities of the underlying MAC layer. Significant MAC layer operations are performed by the initiator, which is the station that transmits a data packet frame onto a network segment and the target, which is the station that receives, and may acknowledge, the data packet frame sent by the initiator.

In an inter-segment transfer through a single bridge:

the source is also the initiator of the data packet frame on the first network segment, but the target of that data packet frame is the bridge, which is not the destination; and the bridge is the initiator, but not the source, of the data packet from on the second network segment, where the target of that data packet frame is also the destination.

At the physical layer the terms transmit and receive apply to the stations that physically transfer any type of frame to and from the network medium. Therefore:

An initiator transmits a data packet frame to a target, which receives the data packet frame.

After receiving the data packet frame, the target may transmit an acknowledgement frame to the initiator.

In descriptions of programmatic interfaces the terms upcall refers to a procedure call made by a handler for a lower layer of the Oxinet2 protocol, such as a MAC-layer packet driver, to a higher-layer facility, such as a transport-layer transport control state machine, to inform that higher-layer facility of the occurrence of an event (typically the arrival of a packet or parcel); and downcall refers to a procedure call made by a facility for a higher layer of the Oxinet2 protocol, such as a transport-layer transport control state machine, to a lower-layer handler, such as a MAC-layer packet driver, to inform the lower-layer handler of the occurrence of an event (typically the availability of outgoing data or the acceptance of incoming data).

When discussing time measurement functions, a time of day clock is a device that accurately maintains time and date, even when the host system (typically a workstation) is powered off; whereas persistent time sense is a facility that maintains sufficient time information to permit determination of the duration of power interruptions of up to 24 hours to accuracy of better than 10 seconds.

2. Layering

The protocol of the present invention involves the middle three layers of the ISO reference model (network, transport and session). The use of ISO terminology is strictly descriptive, and no use is made of ISO standard protocols at any of these layers. The use of layered protocols facilitates abstraction at the interfaces between various layers. However, within the three layers spanned by the protocol, explicit inter-layer interfaces are avoided to prevent unnecessary overhead.

Figure 6:
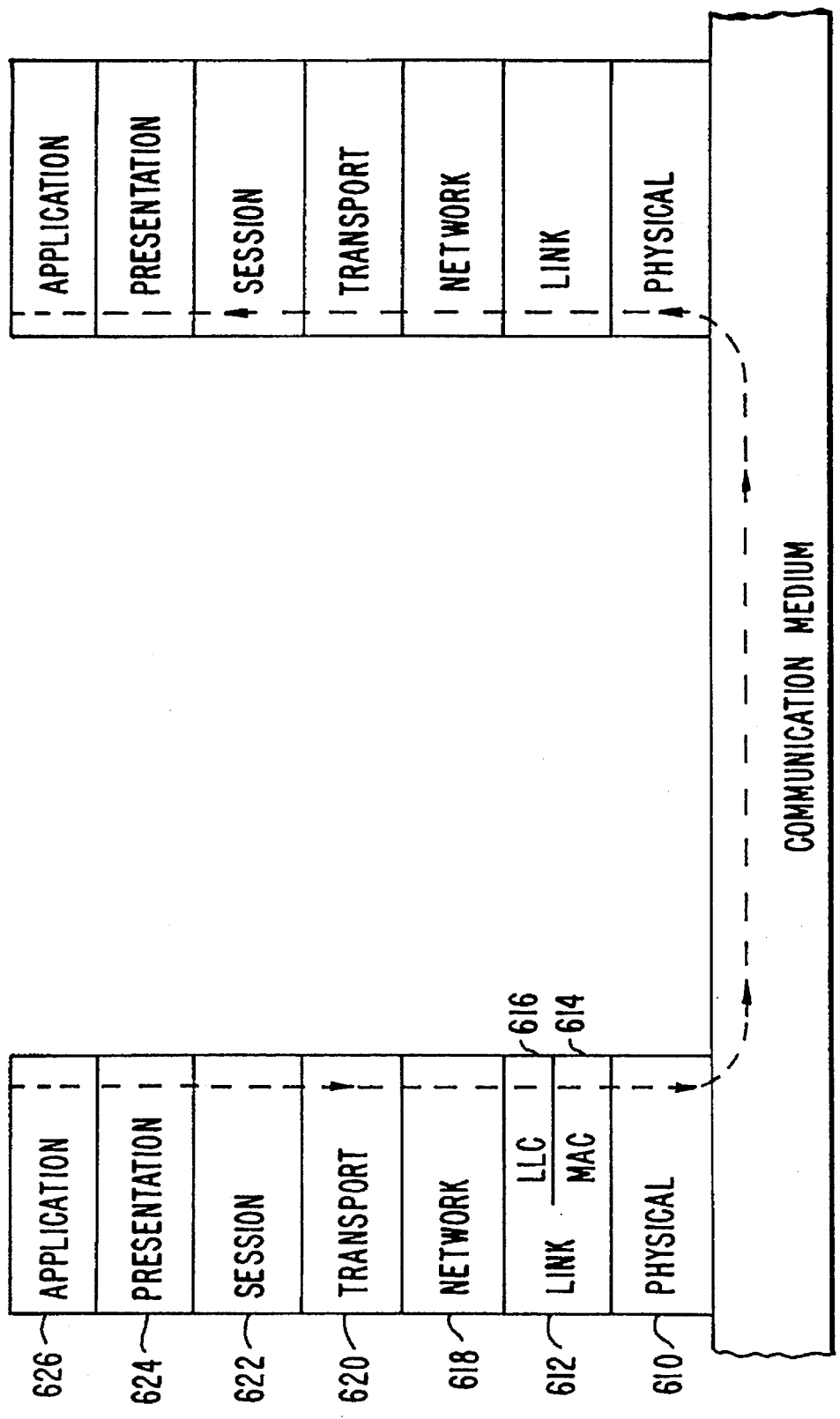
FIG. 6 is a diagram of the ISO layers used by the present invention.

The following paragraphs describe the seven protocol layers shown in FIG. 6 as applicable to the protocols of this invention. These layers are the physical layer 610, the link layer 612, which is subdivided into a media access control (MAC) sublayer 614, and a logical link control (LLC) sub-layer 616, a network layer, 618, a transport layer, 620, a session layer, 622, a presentation layer 624, and an application layer 626.

Physical Layer

The physical layer 610 involves the network media and transceiver interfaces necessary to transfer a raw bit stream over those media. These transceiver interfaces are implemented in hardware, either as standard components or as modules. The operation of the physical layer components are transparent to all higher layers other than the MAC layer. However, the different characteristics of the wired and RF (wireless) networks dictate differences in the network-layer strategies for the two types of physical media. The RF network, for example, is implemented with Wireless Telemetry System (WTS) spread spectrum RF transceivers.

Link Layer

The link layer 612 in the ISO reference model is not well matched to real-world local area network implementation, since link layer activities include both highly media-specific aspects, such as media arbitration and acknowledgement methodologies; as well as media-independent aspects, relating to the multiplexing of multiple, higher-layer protocols over a single physical interconnection path. As a result, the link layer for LANs is sub-divided into the Media Access Control (MAC) Sub-Layer and the Logical Link Control (LLC) Sub-Layer. There is little direct usage of the term "link layer" for LANs, and the MAC and LLC sub-layers are commonly referred to as full-fledged layers.

MAC Layer

The MAC layer 614 defines the frame formats, addressing techniques, error detection or correction methodology, and the media arbitration algorithms for use over the physical layer. The interface between the MAC layer and higher layers involves the transfer of network frames and indication of status concerning delivery or non-delivery of such frames. Inter-network bridging may also take place at the MAC layer, with bridges (generally implemented using one or more dedicated processors) transferring packets between networks under direction of network administrative services that operate at the network layer.

The network, transport, and session layer facilities of this invention are based on the assumption that the underlying MAC layers are reliable. This requires that MAC layers only generate a positive acknowledgement in cases where the data packet being acknowledged has been received without error (or been successfully corrected in cases where error correcting codes are used) and has been copied into an available packet buffer. The software interface to the MAC layer is known as a packet driver.

For the ARCNET link, the MAC header is that of a standard ARCNET frame (source ID, destination ID, continuation pointer) in which the ARCNET node ID of each station is dynamically assigned in a nonconflicting manner when that station joins the network: ARCNET node Ids are not used as part of the Oxinet2 message routing, only as a means of directing the ARCNET MAC frames between ARCNET-connected stations. All Oxinet2 frame validation and bridging is done using the Oxinet2 station Ids contained within the network layer Oxinet2 packets. The ARCNET media arbitration uses self-initializing token passing, while error detection uses CRC-16. The ARCNET positive acknowledgement (ACK) frame, as generated by the ARCNET network controller chip, meets the requirement for a reliable MAC layer acknowledgement facility.

For the Oxinet2 RF network, the MAC frame format is essentially an Oxinet2 packet encapsulated between a length field and a frame check sequence. The RF media arbitration uses TDMA (time-division multiple access), based on dynamically-assigned time slots, relative to synchronization signals generated by RF bridges. This arbitration scheme permits the wireless transmitters and receivers to be powered-off most of the time, substantially extending battery life for the RF stations. A 1-byte SLRC, plus redundant transmission of control frame information, is used for error detection. A 6-byte error-correcting code is used to permit most errors in the contents of the Oxinet2 packet to be corrected without requiring retransmission. The RF MAC layer positive acknowledgement indication which may be piggybacked with a subsequent data packet frame, meets the requirement for a reliable MAC layer acknowledgement facility.

LLC Layer

The LLC layer 616 is concerned with maintaining multiple logical communication activities over a single physical path. While LLC functions can include connection management (such as for IEEE 802.2, type 2 connection-based service); for most LAN usage, connectionless (sometimes called datagram) service is most appropriate. In the connectionless environment, the LLC layer is practically nonexistent, with its primary purpose being to provide a means of distinguishing between multiple protocol types being used over the same MAC layer. To accomplish this on ARCNET, a unique protocol identifier byte is supplied immediately after the MAC header of each frame. Frames with protocol types other than Oxinet2 that are received at Oxinet2 ARCNET interfaces are either discarded or passed to protocol handlers for such other protocol types (if any). On the Oxinet2 RF network, only Oxinet2 protocol is supported, so no LLC header is required.

On ARCNET the Oxinet2 protocol identifier is the registered ARCNET system code assigned to Radiant Systems, by Datapoint Corporation, for Oxinet2 usage (D9h). The use of this system code in all Oxinet2 packets on ARCNET permits the Oxinet2 protocol to coexist with other, simultaneous usage of the same physical and MAC layers by other protocols serving other software and users. However, despite this use of an ARCNET system code, it is not intended that ARCNET segments of an Oxinet2 network be shared for any purpose other than the interconnection of Oxinet2 devices.

Network Layer

The network layer 618 is concerned with the establishment and maintenance of connections between logical entities on the network. These functions involve:

1. Routing, in which the session administrator service at the workstation establishing the session configures the bridge(s) that connect the appropriate network segments to forward packets appropriately;

2. Roaming, in which the session administrator service at the workstation handling the session detects that communication with a satellite RF station that was lost via one bridge has been reestablished via a different bridge, and reestablishes both the route and the transport layer communication appropriately; and 3. Packet validation, in which addresses are recognized and filtered for packets being handled by or for the transport layer.

The session administrator service is implemented by software on the Intelligent Network Adapters (INAs) installed in workstations. The packet validation functions are implemented on all stations, either by firmware or by driver-level software.

Transport Layer

The transport layer 620 is responsible for moving the data stream between logical entities at various points on the network. Packetization, retransmission due to MAC layer errors, and routing control are transparent to users of the transport layer. The transport layer is provided by transport control state machines implemented in software on gateway, (hub) processors, INAs, and RF bridges.

Session Layer

Transport services take place in the context of sessions, which are virtual circuits for the exchange of packets between particular pairs of communicating workstations and gateways. Sessions are established using the network layer services, and operate through direct access from the transport control state machines to the MAC layer packet drivers once the session is established. Session connection and disconnection functions are provided as preprogrammed functions on the gateway processors in satellite interfaces to network segments. Connect request handling is implemented in software at workstation interfaces to network segments. RF bridges operate at the network and MAC layers, and do not participate in sessions.

The session layer also handles the multiplexing of parcels sent by different services into packets for transmission to the session partner, and the demultiplexing of parcels sent by the session partner for delivery to the designated destination services. Preferential handling of certain parcels, and selective discarding of parcels during periods of buffer exhaustion, is performed at this layer based on parcel precedence. The software interface to the session layer is known as a parcel driver.

The protocol definition of the present invention ends at the session layer. For completeness, the higher layers are discussed below.

Presentation Layer

Because data transfers utilize independently-generated parcels, the principal activity at the presentation layer is to serve as an Application Program Interface (API) to the programming environment(s) used to implement the application layer functions. This API transfers parcels to and from the application layer, and can therefore provide uniformity for access to local services (within a cluster of instruments attached to a hub) and to remote services, that require use of at least one network segment, and a session, to communicate with stations external to the cluster.

Application Layer

The entities which actually perform the useful work of a system exists at the application layer. With the exception of some utility programs used to configure and maintain the network, these entities are outside the scope of this protocol.

3. Addressing

FIG. 6 shows the different fields of a parcel 710 and a packet 712. Application layer entities are identified by service identifiers (OID and RID in parcel 710), each of which are virtual labels that identify a service. Parcels 710 are sent between such services without any direct knowledge by either the originator or the recipient of the parcel regarding where the other service provider resides. This form of virtual addressing permits both the processor on which a service is performed, and the network path used to communicate with that processor, to change dynamically, while communication is in progress, without interfering with application layer communication. The operation of the protocol shields the application layer entities from any awareness of these changes. The key to implementing such transparency is the addressing structure.

Addresses are layered, in keeping with the protocol layering:

1. Service identifiers (OID, RID) and tags (STAG) DTAG) constitute presentation layer addresses in parcel 710, 2. session numbers (SSN) constitute session layer addresses in packet 712, 3. station Ids (STID) constitute network and transport layer addresses in packet 712, and 4. MAC source (SID) and destination (DID) Ids constitute MAC layer addresses.

Network Addresses

Network addresses, referred to as handles, contain the unique identifier of a session layer entity. This entity is a station in the case of all device types except workstations, or is the handler for a particular data stream within an Oxiview workstation.

A handle is a 4-byte value comprised of two fields:

1. The first 3 bytes of the handle are the station ID (STID), that provides the network layer address to uniquely identify the network interface used by the session layer entity represented by this handle; while 2. The fourth byte of the handle is the session number (SSN), that provides the transport layer address to uniquely identify the session to which this packet belongs, within the context of the designated station. Session number zero is used strictly for packets concerned with establishment of a session or with gathering network statistics from the station.

| BYTE | LAYER | NAME | USED TO IDENTIFY |
|------|-----------|------|---------------------------|
| 0    | Network   | STP  | Station type              |
| 1–2  | Network   | SRL  | Serial number within type |
| 3    | Transport | SSN  | Session number            |

Station Type

The station type is globally administered to be unique, with type codes and serial numbers set at the factory.

Serial Number

The serial number (SRL) is a 16-bit, value that uniquely identifies particular units within each station type. Serial number zero is never assigned because zero is used as a wildcard value in STID matching. If more than 65535 units (this value is $2^{16}-1$ because serial number 0 is never used) of a given station type are needed, more than one type code value may be assigned to a single kind of station.

For transmission on the network media, the low-order byte of the serial number, designated SRL(L) is transmitted first and the high-order byte of the serial number, designated SRL(H) is transmitted second.

Session Number

The session number (SSN) uniquely identifies a half-session, within the context of the station, at which the transport control state machines for that half-session operate. At workstations, where multiple sessions may be active simultaneously, session numbers are assigned by the network control functionality. This transport layer entity is implemented in software on INAs at Oxiview workstations. At satellite clusters, only one session may be active at any time. Accordingly, gateway modules always use session number 1 to identify this session. SSN usage rules are:

1. When no session is in progress packets are sent with SSN=0 in the DHD.
2. The SSN field in the SHD of the packet that transfers a CONN_REQ (connect request) parcel contains at the (non-zero) session number for the half-session requesting session establishment. In the case of connect requests from satellite stations, this SHD always contains SSN=1.
3. The SSN field in the SHD of the packet that transfers the corresponding CONN_REP (connect reply) parcel contains the (non-zero) session number for the half-session at the replying station.
4. The SSN fields of all packets transferred during a session contain the values appropriate for the half-sessions at the source and destination stations.

Satellite stations are limited to a single session, with SSN=1. Workstations maintain multiple sessions, each one communicating with a separate instrument or cluster. The current implementation restriction, based on the defined requirements for system capacity, requires at least 70 sessions at any workstation:

1. 64 sessions for connection to satellite stations,
2. 5 sessions for control communication with RF bridges, and
3. 1 or more "phantom" sessions for use in handling connect requests, including the extra sessions created in the process of make-before-break session manager handoffs at satellite clusters.

Handle validation at the target stations for the DHDs of incoming packets takes place as follows:

1. The STID is checked for being equal either to the assigned STID of the receiving station or to the broadcast code (zero).
2. If the STID is valid, the SSN is checked for being that of an active session. An SSN of zero is accepted for communication with the session administrator functionality of the station, even if no session is active.
3. If the SSN is valid, the appropriate receiver state machine is activated to process the packet. After processing by the receiver state machine, the parcels in the packet are demultiplexed for distribution to the appropriate presentation layer entities.

If any of these checks detects an invalid address, the packet is discarded without further processing.

Parcel Addressing

Oxinet2 parcel addresses are comprised of two components:

1. The tag, that identifies a specific instrument within a cluster, and
2. service identifier, that identifies the abstract entity within the instrument, known as a service, which is the application layer entity using the Oxinet2 communication facilities.

When gateway modules communicate with workstations, the parcels packed into network packets contain the presentation layer addresses (tags and service identifiers) necessary to identify the recipient service at the other end of the virtual circuit represented by the session, but do not contain the destination identifiers.

Tags (Instrument IDS)

Tags are used to identify the instrument, within satellites; or the primary functional entity, with workstations. Each parcel contains both a source tag (STAG), and a destination tag (DTAG).

Tag values are administered globally, subject to the following rules:

1. The tag value of zero always refers to the local presentation layer entity. Parcels with DTAG=0 are never transmitted onto the network.
2. Tag values in the range 1 to 223 (01h-DFh), inclusive, refer to satellite entities (primarily instruments). These DTAG values default to the same values as the associated instrument type (ITP) values.
3. Tag values in the range 224 to 255 (E0h-FFh), inclusive, refer to workstation functional entities. When parcels with DTAG values in this range are received from the network by gateway modules, these parcels are forwarded to the workstation without regard for their recipient service identifier (RID) value.

Service Identifiers

Service identifiers are used to identify the specific application layer entity within the instrument or workstation function designated by the tray. Each parcel contains both an original identifier (OID), interpreted within the context of the STAG (at workstations), or the composite service table (at satellite clusters); and a recipient identifier (RID), interpreted within the context of the DTAG (at workstations), or the composite service table (at satellite clusters).

Service identifier values for certain global services are pre-allocated. All other service identifiers are assigned dynamically within appropriate ranges. Service identifiers at satellite clusters are assigned sequentially from the range 08h-F7h by the session manager. Service identifiers at workstations are assigned sequentially within the range 08h-F7h in a manner appropriate to workstation software. Services requiring fixed identifier values have service identifiers equal to their service names, assigned in ranges 00h-07h for satellite services of F8h-Ffh for workstation services.

Service name values are administered globally, subject to the following rules:

1. Service name values in the range 0 to 223 (00h-Dfh), inclusive, refer to services provided within satellite entities (primarily instruments).s
2. Service name values in the range 224 to 255 (E0h-Ffh), inclusive, refer to services provided within workstations.

Action Codes

Action codes uniquely identify functions to be performed at recipient services. Action code values are used, within most modules, to direct incoming parcels to the proper internal task for processing.

Action codes are assigned globally. Within each range the specific code assignments are arbitrary, so long as they are uniquely decodable. For network control actions, the action codes and associated parcel formats are defined below under Network Operation. For instrument parcels, the recommended practice for action code assignment is as follows. The high-order byte of the action code is the service name value. The high-order two bits of the low-order byte of the action code are encoded in the same manner as the Kind bits (bits 7-6) of the parcel flags byte. The low-order six bits of the low-order byte of the action code are assigned in ascending numerical sequence, with the restriction that the same value should have the same generic meaning across different services. For example, if the value 3 is used for periodic trend update, this will apply for SpO service, respiration service, ECG service, etc.

Frame Formats

The Oxinet2 protocols are designed for usage over a plurality of physical and link layers, including ARCNET and the Oxinet2 RF Network. This section depicts the layer of the fields within Oxinet2 packets, the layout of the fields within Oxinet2 parcels, the packing of parcels within packets, the encapsulation of packets within ARCNET and RF Network MAC frames, and the encapsulation of parcels within ARCNET MAC frames.

Figure 7:
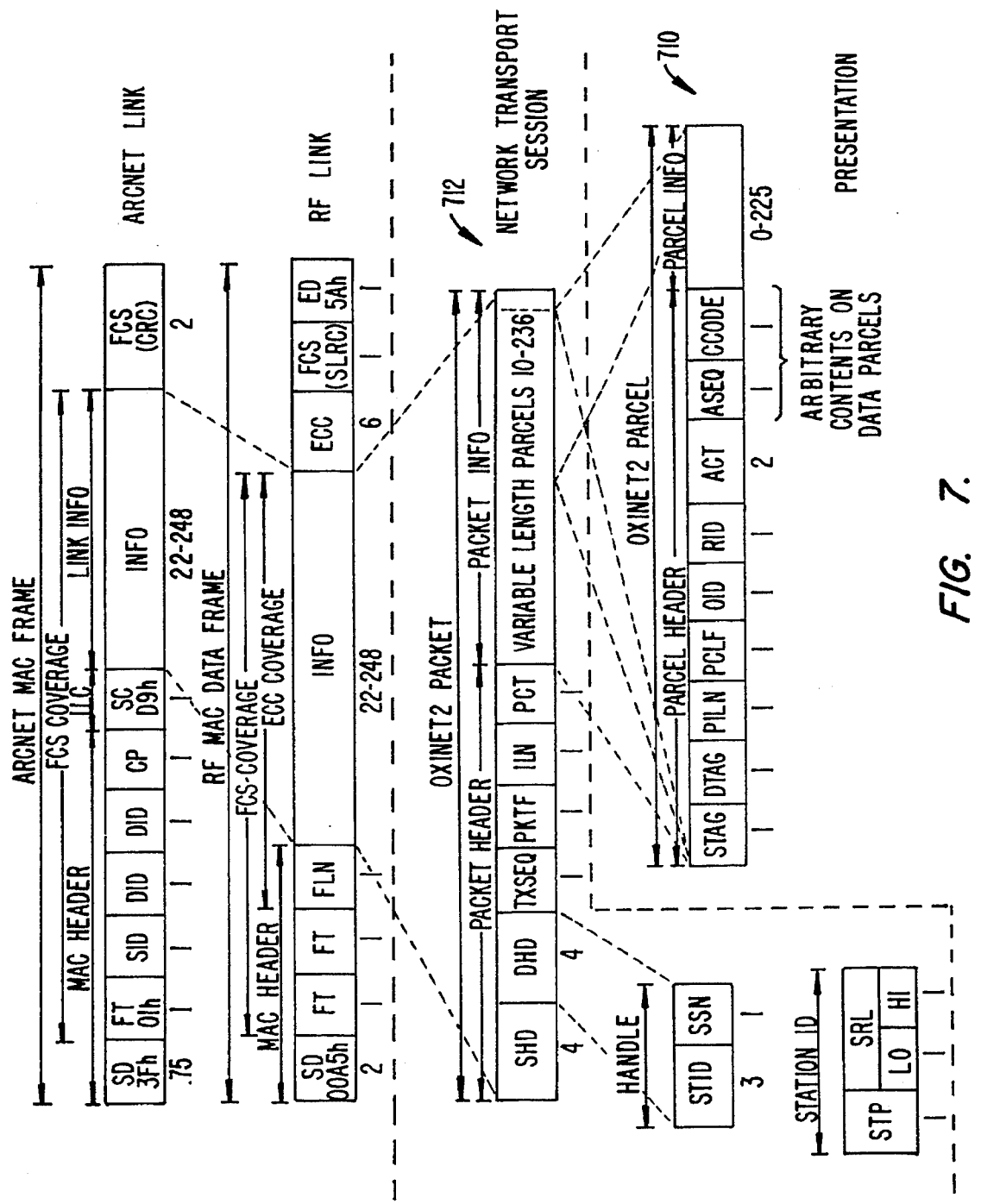
FIG. 7 is a diagram showing the fields of the parcels and packets of the present invention.

The Oxinet2 Protocol Formats diagram in FIG. 7 depicts the layering of all Oxinet2 facilities from the link through the presentation layers.

Packet Format

All Oxinet2 packets consist of not more than 248 bytes, including a 12-byte Oxinet2 (network/transport/session layer) header, and a 10- to 236-byte information field.

Limiting the packet size to 248 bytes permits use of short packet mode on ARCNET, and keeps the total strength of RF packets, including their 6-byte FCS, to not exceed 2040 bits, as is required by the error-correcting code used with the RF physical and MAC protocol. This short packet size limits the RAM required for packet buffering, to facile implementation of gateway modules using small amounts of circuit board space and electrical power.

Parcel Format

All Oxinet2 parcels consist of not more than 236 bytes, including a 10-byte parcel (presentation layer) header, and a 0- to 226-byte information field.

Limiting the parcel size to 236 bytes permits the maximum-length parcel to fit into the information field of an Oxinet2 packet.

MAC Headers

Each Oxinet2 packet or parcel is encapsulated in the appropriate frame for the network type over which the packet or parcel is being transmitted. The MAC header occupies the first several bytes of the resulting MAC frame. The contents of these bytes are defined by the particular physical, MAC, (and LLC) layers in use. Oxinet2 session services do not directly utilize the physical and MAC header information in the MAC frames containing Oxinet2 packets.

The network driver in each station must supply the appropriate MAC and LLC header information for each outgoing frame. In some cases this information is supplied using values saved from previously received incoming frames.

Parcel Header

The parcel is the basic unit of information transfer between the application layer entities. Each parcel begins with a 10-byte parcel header. The parcel header is used to: (1) direct the parcel to the appropriate application layer entity; (2) define the parcel's length; (3) designate any special properties of the parcel; and (4) identify the action of the parcel, thereby conveying a specific command or datum and implicitly defining the format of any data in the parcel's information field.

The parcel header is comprised of nine fields, the last two of which may have arbitrary contents in data parcels. The contents and usage of each of these fields are detailed in the following section.

| OFFSET | NAME | USAGE |
| --- | --- | --- |
| 0 | STAG | Source tag |
| 1 | DTAG | Destination tag |
| 2 | PILN | Parcel information Length |
| 4 | OID | Originator service identifier |
| 5 | RID | Recipient service identifier |
| 6–7 | ACT | Action code |
| 8 | ASEQ | Application sequence number |
| 9 | CCODE | Completion code |

Source Tag (STAG)

The source tag field contains the tag value that identifies the instrument or workstation-based function selling this parcel. Specific tag values are assigned to each type of instrument and workstation-based function.

Destination Tag (DTAG)

The destination tag field contains the tag that identifies the intended recipient instrument or workstation-based function for this parcel. In the case of parcels that contain replies to previous requests, or parcels that are periodic data reports in response to previous reporting action, the DTAG of the reply parcel of data parcel contains the value obtained from the STAG of the corresponding request parcel.

Specific tag values are assigned to each type of instrument and workstation-based function.

Parcel Information Field Length (PILN)

The parcel information length field contains the total number of bytes in the information field of the parcel. the minimum information field length is 0 bytes, and the maximum length information field length is 226 bytes.

Parcel Flags (PCLF)

The parcel flags field contain several indicators relating to the handling of the parcel by the network control functionality. The usage of this field is independent of the ACT field, which relates to the handling of the parcel by the recipient at the application layer.

The usage of PCLF bits are detailed below:

| BIT | NAME | USAGE |
| --- | --- | --- |
| 7–6 | K (Kind) | These bits indicate the kind of action conveyed in this parcel. This indication is used to determine the length of the parcel header, and to implement reply timeouts; but it is not validated against the action code by parcel handling routines. These bits are encoded as follows:<br>00 = reserved<br>01 = request<br>10 = reply<br>11 = data |
| 5 | D (Destination type) | This bit indicates the type of addressing used with this parcel. If set = 0 the DTAG is matched against the instrument's ITP. If set = 1 the DTAG is matched against the station's |

| BIT | NAME | USAGE |
|---|---|---|
| | | DID. Replies to previous requests and data reports sent pursuant to previous actions are sent using the same D-bit value as the corresponding request. |
| 4–2 | — | reserved |
| 1–0 | P (Precedence) | These two bits specify one of four precedence levels that define how the parcel is to be enqueued at a gateway while awaiting transmission on the network, when the parcel is packed and transmitted on the network, and how the parcel is handled in the event that all gateway's buffers are full. Operation of the precedence mechanism is detailed in Section 5.5.1. Reply parcels are generated using the same precedence as the corresponding request parcel. Workstations always generate request parcels using precedence 1. |

Originator Service Identifier (OID)

The originator service identifier field contains the identifier of the application layer entity sending this parcel. Specific service identifier values are assigned to each virtual service available within the Oxiverse.

Recipient Service Identifier (RID)

The recipient service identifier field contains the identifier of the application layer entity intended to be the recipient of this parcel. In the case of parcels that contain replies to previous requests, or parcels that are periodic data reports in response to previous reporting actions, the RID of the reply parcel or data parcel contains the value obtained from the OID of the corresponding request parcel.

Presentation layer entities at all stations dispatch incoming parcels to the application layer based on RID values. If a parcel is received at a station that has no handler for the specified RID, that parcel is discarded by the presentation layer. If a handler for the specified RID is present, the parcel is dispatched to that handler without regard (nor knowledge) for whether the specified action is supported by that service.

Action Code (ACT)

The action code field contains a 16-bit value that uniquely identifies the action to be taken in processing the contents of this parcel at the application layer. The low-order byte of the action field, designated ACT (L), is transmitted in byte 6 of the parcel and the high-order byte of the action field, designated ACT(H), is transmitted in byte 7 of the parcel. Action code uniqueness is maintained through global assignment.

Application Sequence Number (ASEQ)

The application sequence number field contains an 8-bit value that identifies the order in which parcels are generated. For request parcels, the ASEQ is incremented for each parcel provided by the application layer to the presentation layer. For reply parcels, the ASEQ value is copied from the corresponding request parcel. For data parcels, application sequencing is not required, and the ASEQ field is not used, thereby permitting a longer data parcel information field.

Presentation layer emits entities handling outgoing request parcels retain the outgoing ASEQ value for matching against incoming reply parcels. If no more than 255 requests may be simultaneously outstanding at a station, ASEQ value may be generated globally. Otherwise, ASEQ values should be generated separately for each session or service.

ASEQ ordering is not enforced by the presentation layer, but may be used by the application layer entities themselves to defer, or to reject, replies received in the incorrect order.

Completion Code (CCODE)

The completion code field is used to indicate the status upon completion of the requested action. The CCODE value is set to zero in all request parcels. The recipient service sets the CCODE value in the reply parcel to indicate the success or failure, and the reason for failure, of the requested action. A reply CCODE value of zero indicates successful completion; whereas a non-zero reply CCODe value indicates unsuccessful completion, with the value designating a reason for the failure.

Since data parcels are only generated as part of properly operating actions, the transmission of a data parcel constitutes implicit indication of success. Therefore, completion codes are not required in data parcels, and the CCODE field is not present, thereby permitting a longer data parcel information field.

Parcel Kinds

The "kind" of parcel distinguishes the general properties of the action communicated in that parcel. There are three kinds of parcels exchanged in Oxinet2 communication: (1) request parcels, (2) reply parcels, and (3) data parcels.

The kind of parcel may be determined by from the K-bits in the parcel flags. Because the K-bits are generic, and provide no information for matching replies to their corresponding requests, it is recommended that each range of action code be assigned in such a manner that the application layer entity using that range of action codes be able to distinguish request, reply, and data parcels by some algorithm aspect of the action code values themselves. The ASEQ values may be used to match specific replies to their corresponding requests.

Request Parcels

Request parcels are imperative commands for which a subsequent reply parcel is expected. Presentation layer entities generally maintain a time-out after sending request parcels to detect cases where the expected reply parcels are not received.

All network control activities on Oxinet2, as well as most application layer activities at satellite stations, are initiated using request parcels.

Reply Parcels

Reply parcels are sent in response to previously received request parcels. Each request parcel requires a separate reply parcel to be sent. Receipt of the reply parcel indicates completion of the requesting action, and communicates completion status either implicitly or explicitly. The reply parcel may also contain data returned in response to the request.

Data Parcels

Data parcels are used for general communication of data, status, and aperiodic events. Physiological parameters, reports, alarms, trends, and waveforms are all examples of information transferred in data parcels.

The sending of data parcels by each specific application layer entities is enabled by an appropriate request parcel. Data transfer may be enabled for:

(1) continuous, periodic reporting, as is used for sensor readout, and trend accumulation;

(2) continuous, aperiodic reporting, as is used for alarms;

(3) one-time, specified-quantity reporting, as is used for trend readout; or (4) one-time or continuous, specified-duration reporting, as is used for waveform readout.

ITP-Directed Parcels

Parcels sent between workstations and satellite stations are generally addressed to services within specified instruments. These parcels contain:

(1) their own ITP (identifying a workstation-based function) in the STAG field;
(2) the intended recipient's ITP in the DTAG field;
(3) their own service ID in the OID field;
(4) the intended recipient's service ID in the RID field; and
(5) the D-bit in the PCLF field set to zero.

DID-Directed Parcels

Parcels sent between entities within a satellite cluster are generally addressed to services at specific stations. These parcels contain:
(1) their own DID in the STAG field;
(2) the intended recipient's DID in the DTAG field;
(3) their own service ID in the OID field;
(4) the intended recipient's service ID in the RID field; and
(5) the D-bit in the PCLF field set to one.

Network Protocol

The network protocol is used to transfer Oxinet2 packets between workstations and satellite clusters over ARCNET and the Oxinet2 RF network. An ARCNET segment is used for all communication into and out of workstations. An ARCNET segment is used for all communication into and out of workstations. Satellite clusters may be (1) directly connected to the ARCNET segment, using an ARCNET gateway module, or (2) indirectly connected to the ARCNET segment using an RF gateway module communicating through an RF bridge on the ARCNET segment.

Connections to a network segment take place through gateway modules. While multiple gateways may provide simultaneous physical attachment to one or more network segments, no more than one gateway may be engaged in active session communication with a workstation at any time.

The parcel is the basic unit of information transferred between the application layer entities. One or more parcels may be carried in each Oxinet 2 packet; however, parcels are never split across packet boundaries. Parcels communicated through any particular session are delivered according to the parcel precedence rules defined below.

Network MAC and LLC Usage

Oxinet2 packets are encapsulated into ARCNET packets or RF packets as appropriate for the link layer facilities being used on the particular network segment.

Usage with ARCNET

When Oxinet2 packets are sent via ARCNET, the necessary MAC information is the (1) frame type (FT), which is a code of 01h, indicating data packet, provided by the station's network controller chip; (2) source node ID (SID), provided by the station's network controller chip; (3) destination node ID (DID), provided by the network driver based on information associated with the DHD of the session, and transmitted twice by the network controller chip as a means of ensuring correct MAC layer address validation at the recipient station; and (4) continuation pointer (CP), that encodes the length of the encapsulated Oxinet2 packet plus the LLC header byte.

In addition to the MAC header, ARCNET uses a MAC trailer containing a 2-byte frame check sequence (FCS), calculated by the station's network controller chip. This frame check sequence, calculated using the CRC-16 polynomial, is present to permit rejection of frames received with data errors. The ARCNET FCS does not provide error correction, which is deemed unnecessary due to a bit error rate on ARCNET which is less than 1 in $10^{12}$.

Usage with the Oxinet2 RF Network

When Oxinet2 packets are sent via the RF network, the spread-spectrum coding used by the RF transceivers provides substantial rejection of non-Oxinet2 signals. The encapsulation includes a 4-byte header containing a starting delimiter, frame type (repeated), and frame length; and a 7-byte trailer containing a Reed-Solomon error correcting code and an ending delimiter. The error correcting code permits correction of burst errors up to two byte sin length, and is expected to permit over 98% of RF packets to be used without re-transmission despite a bit error rate which could be as large as 1 in $10^6$.

MAC Address Usage Rules

MAC frames on ARCNET and the RF network may be sent with destination addresses that contain either (1) zero, indicating a broadcast to all stations; or (2) a non-zero value, indicating that the frame is intended to be received by a single, designated station.

On the RF network, the broadcast destination is only allowed on packets sent from satellite stations to RF bridges. In all cases, the source addresses of MAC frames contain the assigned MAC address of the sending station. The destination address of a MAC frame being sent as a reply should contain the value obtained from the source address of the frame to which the outgoing frame is a reply.

LLC Header

The sole purpose of the LLC layer in Oxinet2 packets is to permit multiple protocol types to coexist, concurrently on the same MAC layer. This is only significant with ARCNET, since the Oxinet2 RF network is proprietary, and the spread-spectrum coding used as the physical layer of the RF network provides substantial rejection of non-Oxinet2 signals within the same radio frequency band.

The first byte after the MAC header on ARCNET is a protocol type identifier byte, which constitutes a one-byte LLC header. No LLC header is used on the Oxinet2 RF network.

Special MAC and LLC Usage Rules

Upon receipt of a MAC frame from ARCNET the protocol type identifier is checked, and only frames with the Oxinet2 system code are processed. Frames with the protocol types are passed to the protocol handler for that protocol type (if present) or are discarded if there is no protocol handler available for that protocol type.

The MAC layer length information is used to determine the total number of bytes in the frame, which may exceed the number of bytes in the Oxinet2 packet. This situation is detected when the MAC information length exceeds the Oxinet2 packet information length. In such cases the extra bytes at the end of the frame (beyond the Oxinet2 information length) are not used.

This length difference may occur because the ARCNET network controller chip requires the MAC information of a data packet to be justified to the end of its data buffer. In certain implementations, especially those based on limited-performance microcontrollers in gateway modules, implementers may choose to pre-allocate a MAC information field of a particular length, even if the Oxinet2 packet is shorter, to avoid the overhead of repeated, memory-to-memory movement of overlapping areas in the packet buffer RAM.

Upon receipt of an Oxinet2 packet from either ARCNET or the Oxinet2 RF network while no session is in progress
- an incoming packet is only accepted if directed to session zero; and
- the only packets accepted are those containing parcels with the following network control actions:
  CONN_REQ, to establish a session,
  RDEE_REQ, to read EEPROM parameters,
  STAT_REQ, to read out status and statistics, and
  STST_REQ, to read out statistics.

Oxinet2 Header

The header portion of each Oxinet2 packet is identical, and the information field of each packet contains as many parcels, ordered according to parcel precedence, as will fit without splitting any parcels across packet boundaries and without transmitting lower-precedence parcels ahead of waiting, higher-precedence parcels.

The Oxinet2 header occupies the 12 bytes immediately following the MAC/LLC header in each MAC frame. These bytes are used by the network layer handler to validate the addresses of Oxinet2 packets received by the station; and by the transmitter and receiver state machines to control the Oxinet2 data stream, determine status concerning delivery of the packet, and determine the contents of the information field of the packet.

The Oxinet2 header is comprised of 6 fields. The contents and usage of each of these fields are detailed in the following sections.

| OFFSET | NAME | USAGE |
| --- | --- | --- |
| 0–3 | SHD | Source handle |
| 4–7 | DHD | Destination handle |
| 8 | TXSEQ | Transmitter sequence number |
| 9 | PKTF | Packet flags |
| 10 | ILN | Information field length |
| 11 | PCT | Parcel count |

Source Handle (SHD)

The source handle field contains the STID of the station, and SSN of the session, which is the source of this packet. Except in the case of packets transferred through bridges, the source is also the initiator (the station physically sending the packet). The value of the SHD field is used as the DHD in subsequent replies to this packet. In addition, for packets with a non-zero SSN in the DHD, the contents of the SHD field are checked to ensure that they represent the active session partner. If any field in the SHD has an incorrect value, then the contents of the packet are discarded, and the count of discarded packets is incremented.

Destination Handle (DHD)

The destination handle field contains the STID of the station, and SSN of the session, which is the intended destination of this packet. Except in the case of packets transferred through bridges, the destination is also the target (the station physically receiving the packet). The contents of the DHD field is checked in each incoming packet.

If the STID in the DHD is equal to the receiving station's assigned to STID, the packet, termed a "directed packet" is accepted by the network layer for processing. The SSN is subsequently validated by the transport layer as described above. If the STID is equal to zero, indicating a broadcast, the packet is accepted by the network layer for processing by the session management functionality of this station. The SSN must contain zero to be valid for a broadcast. In all other cases the packet is discarded and the receiver is immediately reenabled.

Transmitter Sequence Number (TXSEQ)

The transmitter sequence number is used by the receiver state machines to detect, and discard, redundantly received packets. The value used by the transmitter state machine for the TXSEQ field of each outgoing packet is incremented by one upon receipt of (MAC layer) positive acknowledgement of the preceding packet. Once set, the TXSEQ byte of any packet remains unchanged, even if the packet needs to be retransmitted.

Upon error-free receipt of any packet during a session, if the value of the TXSEQ field is equal to the TXSEQ value of the preceding packet successfully received during this session, then the receiver state machine discards the packet and increments the count of discarded packets. When no session is in progress the TXSEQ field is ignored.

Packet Flags (PKTF)

The packet flags field contains several indicators relating to the handling of the packet by the transport and MAC layers. These indicators pertain to the packet as a whole, and are distinct from the parcel flags (PCLF) that appear in the header of each parcel within the INFO field of the packet.

The usage of the PKTF bits are detailed below:

| BIT | NAME | USAGE |
| --- | --- | --- |
| 7 | R (RF) | This flag is set = 1 for any packet forwarded between networks by an RF bridge. |
| 6 | E (error) | This flag is set = 1 for any packet which has been retried or error-corrected at any transport or MAC layer entity between the source and the destination. |
| 5 | S (subnet recon) | This flag is set = 1 in packets sent by gateway modules if there has been a reconfiguration of their subnetwork since the last packet transmission. Once set, this flag remains set in subsequent packets until the gateway's service table is read using a RDSV_REQ parcel. |
| 4–2 | — | reserved |
| 1 | O (returned orphan) | This flag is set = 1 in orphan packets sent back to a workstation from an RF bridge in reply to an RDOR_REQ parcel. Detection of this flag simplifies handling of returned orphan packets at workstations, since the DHD of these packets designate satellite stations. Details on orphan packets are provided in Section 5.7.2. |
| 0 | T (timestamp) | This flag is set = 1 to indicate that the only parcel in this packet contains the ECHO action. This flag may only be set on specially formatted packets used for transfer time measurement, and is further described in Section 5.8. |

Information Length (ILN)

This information length specifies the number of bytes in the information field of the packet. Permissible values range from 10 to 236 bytes. The information field begins immediately after the PCT field and extends for the specified number of bytes. If the total MAC frame information length exceeds the Oxinet2 packet information length plus 12 bytes (for the Oxinet2 header), the bytes following the Oxinet2 information field are ignored.

Parcel Count (PCT)

The parcel count specifies the number of parcels in the information field of this packet. Permissible values range from 1 to 23 parcels. A parcel count of zero is not possible because the only conditions under which an outgoing packet is generated is when at least one parcel is awaiting transmission.

Packet Sequencing

The reliance upon MAC layer acknowledgements to indicate successful delivery of packets leaves open the possibility that the same packet may be (validly) received more than once. This situation is known as redundant reception. Transmit sequence numbering permits detection, and elimination, of redundantly-received packets at the transport layer, which incurs substantially lower overhead than relying on a parcel sequencing mechanism to permit such detection and elimination at the presentation layer or application layer.

The possibility of redundant reception of packets exists because the MAC layer acknowledgement, which serves as positive acknowledgement of packet reception, is transmitted in a separate MAC frame from the data packet being acknowledged. On both ARCNET and the Oxinet2 RF network, it is possible for a packet to be successfully received by the target, then for the MAC layer positive acknowledgement to be incorrectly received (or never to reach) the initiator. In such a case, the initiator will automatically retransmit the packet, causing a redundant reception of the same packet by the target.

Each transmitter state machine maintains a value for use in generating the TXSEQ field in the Oxinet2 headers of outgoing packets. This value is incremented by one upon completion of the packing of each packet for transmission. Once set, the TXSEQ byte of any packet remains unchanged, even if the packet needs to be retransmitted.

Each receiver state machine retains the value of the TXSEQ field from the last validly received packet. Upon successful receipt of any packet during a session, the receiver state machine discards the packet if the low-order bit of the TXSEQ field is equal to the low-order bit of the retained value from the TXSEQ of the previous valid packet of the same session. When no session is in progress the TXSEQ field is ignored by the receiver state machine.

The sole purpose of transmit sequencing in the Oxinet2 packet header is to permit redundantly received packets (within a session) to be discarded at the transport layer. The transmitter sequence number is not used to detect missing packets.

Packet Acknowledgement

The transmitter state machine uses the MAC layer acknowledgement facilities of the underlying network segment to determine whether packets have reached their destinations successfully. The acknowledgement rules are as follows. the receipt of a MAC layer positive acknowledgement by the initiator of any packet indicates successful delivery of that packet to the target on this network segment. Upon receipt of the positive acknowledgement, the transmitter state machine at the initiator may reclaim the transmit buffer used for the delivered packet and prepare to send a new packet during the next transmission opportunity.

On ARCNET receipt of an ACK frame constitutes positive acknowledgement to packet delivery. This is detected as both TA=1 and TMA=1 in the status register of the ARCNET controller chip. On the Oxinet2 RF network, receipt of a positive acknowledgement frame or receipt of a data packet frame with a frame type of 3 Ch constitutes positive acknowledgement of packet delivery.

The receipt of a MAC layer negative acknowledgement by the initiator of any packet, or receipt of no acknowledgement during a defined acknowledgement interval, indicates that the packet has not successfully reached the target on this network segment. The transmitter state machine must retransmit such non-delivered packets until either a positive acknowledgement is received or the session timeout occurs.

On ARCNET the lack of an ACK frame within 78 us of the end of transmitting a data packet frame constitutes negative acknowledgement to packet delivery. This is detected as TA=1 and TMA=0 in the status register of the ARCNET controller chip. Also, the inability to transmit a packet due to continuous failures of free buffer inquiries is considered to constitute negative acknowledgement. This condition, known as a "blocked receiver", is detected when the Excessive NAK bit in the ARCNET controller chip is set, indicating at least 128 consecutive free buffer inquiry failures. An EEPROM parameters, with a default value of 1, is used to define the number of successive Excessive NAK indications constitute a blocked receiver condition.

Due to the typical reasons for a TA=1, TMA=0 condition on ARCNET, the recommended practice for ARCNET packet driver implementation is to retry an unsuccessfully delivered outgoing transmission one time before indicating a negative acknowledgement condition. On the Oxinet2 RF network, receipt of a negative acknowledgement frame or receipt of a data packet frame with a frame type of C3h constitutes negative acknowledgement of packet delivery. Also, no response of any type for a full synchronization interval following transmission of a data packet frame from an RF bridge, or no response of any type during the outbound interval following transmission of a data packet frame to an RF bridge, is treated as being equivalent to negative acknowledgement.

In cases where the target of a directed packet on the RF network is an RF bridge, that bridge must only acknowledge receipt of the packet if there is an active route for that packet in the bridge's routing table, and there are no more packets awaiting transfer via the same route as there are slots assigned for that route in the bridge's synchronization period. Once an RF bridge has positively acknowledged a received RF packet, the bridge must deliver that packet to the designated destination (on the ARCNET) unless prevented from doing so by failure of the network or failure of the recipient station.

Parcel Handling

Application layer entities communicate using parcels. Individual parcels are provided to the session layer for transfer to the session partner. One or more of these parcels are packed into Oxinet2 packets for transfer over the network segment(s) connecting the clusters on which the session partners reside.

The MAC layers used on the ARCNET and Oxinet2 RF network provide reliable confirmation of packet delivery. However, there may be conditions, caused either by physical interference on the network medium or by exhaustion of buffer space at the sending or receiving station, under which outgoing packets are undeliverable, or are deliverable at a lower rate than needed to keep up with the delivery of outgoing parcels from the presentation layer interface.

Parcel Precedence

In order to ensure that the most important parcels are delivered in a timely manner whenever any communication is possible; and to ensure that, if undelivered parcels need to be discarded the least important are discarded first, a system of parcel precedence is used. There are four levels of precedence, listed below in order of decreasing urgency and increasing discardability:

Precedence 0 is used for reporting alarms and status for which delivery is mandatory if any communication is possible. These parcels require timely delivery, so if a newer precedence 0 parcel is presented for delivery, any older parcel from the same source (identified by OID) awaiting delivery is discarded. The newer parcel replaces the older parcels to ensure reporting of the most recent information.

Precedence 1 is used for request and reply parcels. These parcels are unlikely to cause buffer exhaustion because there are generally far more buffers available than there can be meaningful outstanding requests. Precedence 1 parcels are only discarded when insufficient buffer space is available to hold all precedence 0 and 1 parcels.

Precedence 2 is used for transfer of "non-snapshot" waveform data, which is discardable only if absolutely necessary, since the discarded information is not (always) recoverable. Precedence 2 parcels are discarded when insufficient buffer space is available to hold all precedence 0, 1, and 2 parcels.

Precedence 3 is used for transfer of trend data, which is discardable, but where the discarded information is recoverable because 36 hours worth of trend data is buffered within the gateway modules of the instruments. Precedence 3 parcels are discarded whenever insufficient buffer space is available and a new outgoing parcel of any precedence is available.

Precedence is generally defined in the P-bits in the parcel flags of request parcels. Reply parcels are always sent using the precedence of the corresponding request. Data parcels are sent at the appropriate precedence for the type of data being reported.

Gateway modules maintain four outgoing parcel queues, one for each precedence. When buffer space is available, the precedence bits in the PCLF byte are used to determine where to enqueue the new parcel. The sole exception is precedence zero, where the OID is also inspected, and if an existing precedence zero parcel from the same service is queued, the new parcel overwrites the older parcel.

When no free buffers are available to hold a newly arrived parcel, the oldest parcel from the lowest urgency delivery class (which is represented by the numerically highest precedence value) is discarded. This may be the newly arrived parcel in the case that there ar no lower-precedence parcels already enqueued.

Workstations and RF bridges maintain only a single outgoing parcel queue per session, because all outgoing parcel traffic from these stations is precedence 1. Note that precedence only applies to outgoing parcels. Outgoing packets are never discarded unless they remain undeliverable for the session timeout interval.

Parcel Packing

The packing of parcels for transmission over the external network is governed by the following rules:

(1) Packing begins with the oldest parcel of the highest delivery urgency class (which is represented by the numerically lowest precedence value).

(2) All parcels of a given precedence are packed before any parcels at the next lower precedence (numerically higher value) are considered for packing. The only limit on the number of parcels that may be packed into a single packet is the size of the packet information field.

(3) Parcel packing is delayed until the latest possible time prior to the next transmission opportunity on the network segment.

(4) Once packed, parcels remain packed until delivered to the session partner.

Workstations and RF bridges maintain only a single outgoing parcel queue per session, and ignore precedence. Note that precedence only applies to outgoing parcels. Outgoing packets are never discarded unless they remain undeliverable for the session timeout interval.

Session Establishment

Communication between satellite clusters and Oxiview workstations takes place through point-to-point, full-duplex virtual circuits known as sessions. Each session involves two Oxinet2 stations, termed partners, that are generally the gateways to their respective clusters. Each session is comprised of two, simplex half-sessions, each of which implements one direction of the communication between the partners.

The primary purpose of sessions is to provide a mechanism for identifying a data stream between a pair of stations, and for multiplexing all parcel traffic between those stations through packets of that data stream. The specific form o this data stream identification is the assigned session number (SSN), that may be different for the two half-sessions of each session. Session number 1 is always used for the half-session originating at the gateway of an instrument.

In distinct contrast to several protocols ancestral to the Oxinet2 protocol, Oxinet2 sessions are not used to implement (1) acknowledgement, sequencing, and error recovery, all of which are the responsibility of the MAC and application layers;

(2) flow control, which is deemed to be unnecessary on Oxinet2 due to the discardability of lower precedence parcels during periods of network or workstation bandwidth saturation; nor (3) security, which is not necessary because non-Oxinet2 stations are not permitted on Oxinet2 network segments.

Various types of Oxinet2 stations utilize sessions for different purposes. Each satellite cluster maintains a single session with a single workstation for receiving all requests and for reporting all alarms, status, waveforms, and trends. Each RF bridge maintains a control session with each workstation (up to a maximum of 5) for which the bridge is permitted to forward packets. These control sessions are used to receive requests to update the bridge's routing table. Each workstation may participate in up to 70 sessions concurrently, 64 with satellite clusters, 5 with RF bridges, and one (session zero) for handling connect requests.

Session Administrator

The establishment of each Oxinet2 session is the responsibility of, and is initiated from, the satellite cluster. Within a satellite cluster that is not in session with a workstation, a particular gateway module is selected to become the session manager. The session manager attempts to establish a session with a workstation using the technique described below. When this session is established, that gateway commences to offer session manager service to the cluster.

To establish a session, the active gateway sends a connect request parcel (CONN_REQ) to a workstation-based service entity known as the session administrator. Upon receiving a CONN_REQ parcel, the session administrator.

(1) determines whether to grant or deny the request.

(2) generates a connect reply (CONN_REP) parcel with an appropriate denial code if the workstation on which the session administrator is running cannot establish the requested session;

(3) Establishes the necessary route through the RF bridge if the CONN_REQ was forwarded from the RF network, as determined from the state of the R-bit in the PKTF field (the appropriate RF bridge is determined from the SID of the ARCNET packet that delivered the forwarded Oxinet2 packet);

(4) generates a "session start-up" activity on the Root processor of the workstation; and (5) generates a CONN_REP parcel with the assigned session number and an acceptance code to initiate session communication.

The session administrators are software functions. One session administrator is present on each Oxiview workstation, generally implemented on that workstation's INA. This ensures that there is always at least one session administrator active at all times on a (functional) Oxinet2 network.

Session administrators are accessed using the CONN_REQ network control action. The CONN_REQ parcel is sent to all available session administrators in a broadcast packet. Each session administrator responds to every received connect request with a CONN_REP, indicating either success or failure of the session establishment. The CONN_REP parcel is always returned in a directed packet to the station designated by the SHD of the packet that contained the CONN_REQ.

Connection Requests

CONN_REQ parcels are sent in broadcast packets in order to reach all active session administrators, even if the satellite cluster and the workstation are attached to different network segments. This permits session establishment to occur without requiring the satellite clusters to have knowledge of the network topology.

The CONN-REQ MAC, packet, and parcel headers are used as follows:

The MAC header (ARCNET only) contains (1) the SID of the gateway requesting the connection and (2) a broadcast DID.

The Oxinet2 packet header contains (1) an SHD with the STID of the gateway and SSN=1, (2) a DHD of zero, meaning broadcast (including SSN=0 so the request goes to session zero), and (3) a PCT of one (for the CONN_REQ parcel).

The CONN_REQ parcel header contains (1) an STAG with the ITP of the instrument in which the active gateway is installed, (2) a DTAG of E0h, indicating network control functionality of the workstation, (3) an OID of 02h indicating session manager service, (4) an RID of F0h, indicating session administrator service, and (5) an ACT of CONN_REQ.

In cases where there are multiple gateways in a satellite cluster, inactive gateways that become able to communicate on a network segment may attempt to establish a session with a workstation in preparation for an attempt to force a session manager handoff. This procedure uses a make-before-break discipline, wherein (1) the alternate gateway sends a CONN_REQ, with OID of 40h or 44h and a non-zero value in the cur_ssn field of the parcel;

(2) if a successful CONN_REP is received, the gateway attempts to become session manager by sending a HDOF_REQ to the session manager;

(3) if the handoff is successful, the alternate gateway becomes session manager and sends a DISC_REQ to the previous session manager to be forwarded to the workstation via the old session; and (4) if the handoff is unsuccessful, the alternate gateway goes inactive, sending a DISC_REQ to the workstation to terminate the new session.

Connection Replies

CONN_REP parcels are sent in directed addressed to the sender of the CONN_REQ parcel. In the case of replies to requests forwarded by RF bridges, the bridge updates its routing table using address information from the reply, as further defined under "Routing" below.

The CONN_REP MAC, packet, and parcel headers are used as follows:

(1) the SID of the workstation generating the CONN_REP, and (2) the DID copied from the SID of the CONN_REQ.

The Oxinet2 packet header contains (1) an SHD with the STID of the workstation and an SSN value assigned by the session administrator, (2) a DHD copied from the SHD of the CONN_REQ, and (3) a PCT of one (for the CONN_REP parcel).

The CONN_REP parcel header contains (1) an STAG of E0h, indicating network control functionality of a workstation, (2) a DTAG copied from the STAG of the CONN_REQ, (3) An OID of F0h, indicating session administrator service, (4) an RID copied from the OID of the CONN_REQ, (5) an ACT of CONN_REP, (6) an ASEQ copied from the ASEQ of the CONN_REQ, and (7) a CCODE indicating the success or failure of the session establishment attempt.

Reply Processing

Because more than one workstation may be active on the network, it is possible for a single CONN-REQ to result in more than one CONN_REP with successful completion status. The priorities for acceptance of connect requests by session administrators, and for acceptance of connect replies by satellite session managers are (1) the workstation responsible for this administrative domain, (2) the workstation that was the partner in the last session established from this satellite, or (3) any other workstation that will adopt this satellite.

The STID of the last session partner is retained by each satellite as an EEPROM parameter, and the value of this parameter is included in subsequent CONN_REQ parcels, to facilitate implementation of these priorities. To minimize the number of EEPROM write cycles used to perform this function, a satellite waits for at least 150% of the session timeout EEPROM parameter, after a successful CONN_REP rom a workstation other than the last custodian, to determine whether a successful CONN_REP from the last custodian is also pending. This is in addition to the (standard) read-before-write used on all EEPROM updates.

A satellite attempting to establish a session typically accepts the first successful CONN_REP that is received. Then, if a subsequent CONN_REP from a higher priority session partner (as listed above) is received, disconnects from the first partner to accept the second partner. The DISC_REQ indicates the reason for this disconnection as "better partner".

If the subsequent CONN_REP is from a lower priority session partner, the subsequent reply is discarded. By discarding redundant or unsuitable replies, the unnecessary session will terminate due to inactivity at the end of a single session timeout interval.

Because the CONN_REQ is sent as a broadcast, there is no direct acknowledgement of receipt. A station sending a CONN_REQ should wait up to the session timeout interval for a reply. Short-duration retries may be made for up to 3 times the session timeout interval, after which the periods between retries must be increased substantially.

In the case of satellites that are unable to establish a session via a wired network segment, periodic retries do not constitute a threat of generating excessive network traffic nor will they deplete the batteries of the satellite station. However, in the case of satellites attempting to establish a session via an RF network segment, both the transmission bandwidth and the battery power consumed for these periodic retries can be a problem. Accordingly, RF bridges indicate, once per second, using facilities of the RF MAC protocol, the current count of workstations for which that bridge may forward packets. A satellite RF station which has been unable to establish a session via particular RF bridge due to connect completion codes of "connection rejected, do not call back" only needs to retry the connection attempt when this workstation count changes.

RF Bridges

The Oxinet2 architecture permits a single network to span a plurality of segments, connected by bridges. The only type of bridge currently planned is the RF bridge, that connects between an ARCNET segment and an Oxinet2 RF network segment. Each RF bridge connects between exactly two segments. There are no explicit limits on the number of bridges in an Oxinet2 system, but there are a maximum of 5 bridges per workstation and 5 workstations per bridge.

Bridges transfer packets between network segments, reencapsulating them as required by the different MAC layers use don the two, bridged segments. The packets being forwarded are reencapsulated with MAC header information only. The RF bridge does not manipulate the contents of the packet (other than the B- and E-flags in the PKTF byte), and does not participate in the sessions for which the packets are being forwarded. The RF bridge does maintain a session with each associated workstation for control purposes.

Routing

RF bridges use dynamic routing, meaning that the RF bridge is able to determine the required inter-segment logical connections, termed routes, by monitoring the traffic traversing the bridge. In some cases transfers of communication between bridges is smooth, occurring under the bridge handoff mechanism. In other cases a route may be deleted or changed upon command from the session administrator on a workstation.

Bridges transfer packets between network segments based on a routing table that is updated dynamically. Each bridge only has knowledge of the routes currently traversing that bridge; so that mobile satellite clusters, roaming between the reception spaces of various bridges, will lose sessions through one bridge and establish new sessions through a different bridge. The session administrator can determine that the data stream from this new session is a continuation of the data stream from a previously lost session based on the IID of the instruments in the cluster.

The routing table in each bridge associates the STIDs of satellite stations with the ARCNET Ids needed to transmit the associated packets onto the ARCNET connected to the workstation. The STID of the satellite station is used for routing table lookup because Oxinet2 connect requests are initiated by the satellite station, and each satellite station maintains exactly one session. Accordingly, all traffic from a single satellite STID needs to go to a single destination in traversing any bridge.

By using this approach based on satellite STIDs, it is easy for RF bridges to discriminate RF traffic to a given workstation from an authorized satellite RF station (being bridged through this bridge) and other traffic to the same workstation from a satellite RF station which is currently unauthorized or is assigned to a different bridge.

RF Bridges route all broadcast RF packets to the ARCNET using the broadcast DID (O), so they do not require a route to exist for the STID of a broadcast in order to bridge broadcasts. Accordingly, broadcast packets can be routed without explicit routing table information. This permits CONN_REQ packets, used to establish a session, to be handled without the satellite stations needing to know about the existence of the bridges.

When an ARCNET packet received at an RF bridge contains an Oxinet2 packet with a DHD for which the bridge has an assigned slot, but no established route, the bridge updates its routing table to create a route between the DHD from the packet and the SID of the ARCNET frame used to deliver that packet to the bridge.

Orphan Packets

Once a route is established, this route remains in use until the session is terminated (or implicitly if no traffic has traversed the route for 30 seconds). In the case of a session terminated by a disconnect action, the session administrator must expunge the route information from the routing tables of the bridges by sending a UNRT_REQ parcel.

Re-routing of the session through a different bridge may involve the transfer of packets awaiting delivery to the satellite. Packets awaiting delivery to the satellite via the old bridge, referred to as orphan packets, can occur when transmissions are in progress at the time a roaming satellite RF station moves between reception spaces. Orphan packets cannot occur for packets being transferred from the satellite to the workstation because such packets will be delivered by the bridge even if the route is expunged.

The UNRT_REP parcel from the RF bridge indicates the number of orphan packets associated with the expunged route. The workstation may read back the orphan packets, using RDOR_REQ parcels, and retransmit these parcels to the correct bridge.

Network Operation

This chapter provides details on the transport control state machines used at each end of each session.

Transport Control State Machines

Oxinet2 provides a full duplex virtual circuit, at the session layer, between each pair of communicating partners. Each virtual circuit involves two half-sessions. Each half-session is a unidirectional link, for which the transmitter at the source station and receiver at the destination station are controlled by instances of a simple state machine.

The purpose of these state machines is to (1) coordinate parcel packing in preparation for each transmission opportunity, (2) retransmit packets which are not positively acknowledged at the MAC layer, (3) detect and ignore redundantly received packets, and (4) terminate the session if no positive acknowledgements are received from the session partner (or the bridge on the path to the session partner) for a predefined session timeout interval.

Unlike the transport layer of the Cambridge Byte Stream Protocol, and several network I/O protocols ancestral to the Oxinet2 protocol, the Oxinet2 transport control state machines perform no transport layer sequencing, acknowledgement, nor keep-alives. These are considered to be unnecessary for Oxinet2 because this transport layer operates between a reliable link layer and an application layer that performs sequences checking, and requests retransmission when necessary, for most types of parcels.

Transmitter State Machine

The transmitter state machine diagramed in FIG. 6 handles all outgoing packets for a given partner, provides the transmitter sequence number for all packets it handles, retransmits unacknowledged packets repeatedly, and terminates the session if a session timeout interval elapses without a positive acknowledgement to an attempted transmission.

Transmitter states are (1) Waiting for Parcel (WT_PAR), which is used while waiting for parcels to be supplied by the presentation layer after initialization or upon completion of a packet transmission;

(2) Waiting for Transmission Opportunity (WT_TXOP), which is used after a set of outgoing parcels has been packed into a packet and is ready for transmission or retransmission; and (3) Waiting for Acknowledgement (WT_ACK), which is used after each packet transmission attempt while waiting for a positive or negative acknowledgement.

One integer value is maintained by the transmitter state machine TXSEQ, which represents the current sequence number used for transmission of packets, and is used to allow the receiver to detect and discard redundantly received packets.

One EEPROM parameter is used in the operation of the transmitter state machine The Session Timeout (Ts) defines the interval following packet transmission during which positive acknowledgement, or an incoming packet, must be received from the session partner. The default value for the session timeout is 7 seconds.

Events

The events that can cause state transitions in the transmitter state machine include:

"Parcels Available", which indicates that one or more parcels are enqueued,

"near TXOP", which indicates that a transmission opportunity will occur by the time the available parcels are packed for transmission.

For communication over ARCNET, the near TXOP event is always asserted, since transmission opportunities on ARCNET occur no less frequently than once very 50 ms. For communication over the Oxinet2 RF network, the near TXOP event is asserted a sufficient interval prior to this station's assigned slot for the station's control processor to pack and otherwise prepare a full-length outgoing packet for transmission. This "early warning" of an impending transmission opportunity permits efficient usage of the parcel precedence mechanism on a network where transmission opportunities typically occur only once every second.

"TXOP", which indicates the occurrence of a transmission opportunity on the underlying network.

For communication over ARCNET, the TXOP event is always asserted, since arrival of the ARCNET token at a given station cannot be accurately predicted nor detected, and because the act of "transmitting" a packet on ARCNET, as seen by the low-level packet driver, involves enabling the transmitter on the ARCNET controller chip.

For communication over the Oxinet2 RF network, the TXOP event is asserted at the start of the station's assigned slot.

"Positive ACK", which indicates the receipt of a positive acknowledgement to the most recent packet transmission.

"Negative ACK", which indicates the receipt of a negative acknowledgement to the most recent packet transmission.

"Ts Timeout", which indicates the expiration of the session timeout interval.

Transmitter State Transition Diagram

Figure 8:
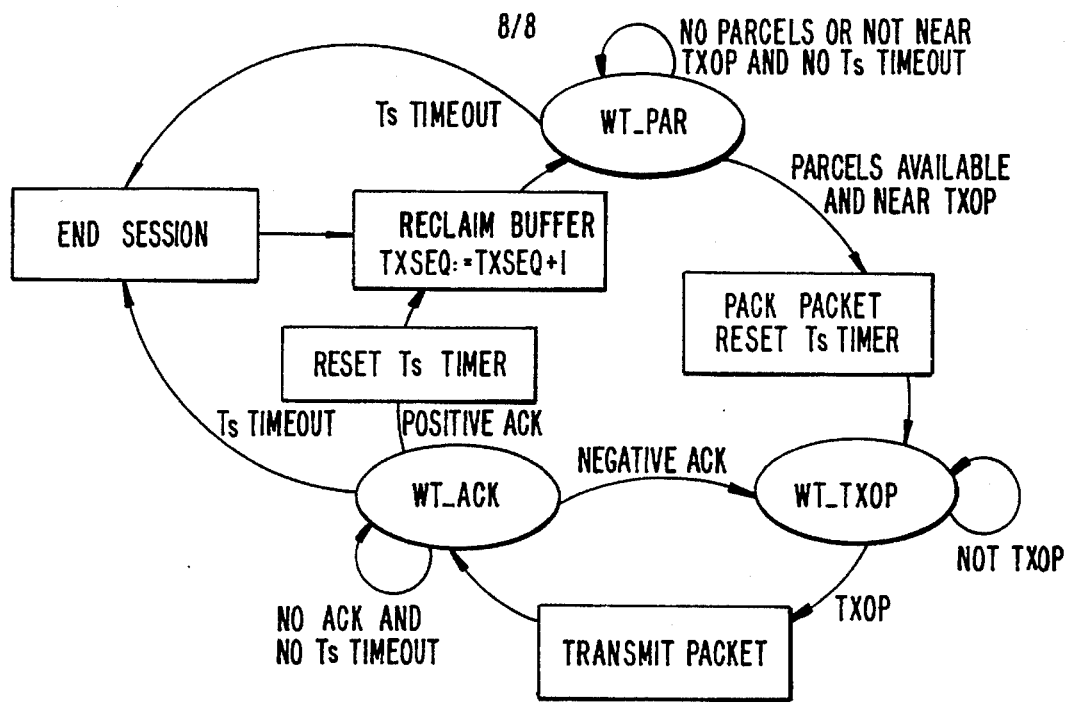
FIG. 8 is a diagram of a transmitter state machine.

Operation of the transmitter state machine is characterized by the diagram of FIG. 8. A narrative description of operation of this state machine follows:

Upon initialization of a transmitter state machine, or upon completion of processing for any packet, state WT_PAR is entered. In state WT_PAR the transmitter state machine is idle, awaiting the coincident availability of an impending transmission opportunity and one or more parcels to transmit. If outgoing parcels have been enqueued during the processing of the previous packet, only the near TXOP event (which is always asserted when using ARCNET) is needed to exit WT_PAR state.

Upon exit from WT_PAR state a packet is packed using as many of the available parcels will fit into the packet (or all that are on the queue if the packet is not full). Parcels are taken from the outgoing parcel queue in order of their precedence, and within each precedence level in order from oldest to newest. After the packet is prepared for transmission, the session time (Ts) is reset (and restarted), and state WT_TXOP is entered.

In state WT_TXOP the transmission state machine is awaiting the arrival of a transmission opportunity. On ARCNET this state is effectively null, since the continuous assertion of the TXOP event causes immediate exit from this state.

Upon exit from WT_TXOP state the packet is transmitted, and state WT_ACK is entered.

On ARCNET, "transmitting" the packet refers to placing the packet into the packet buffer of the ARCNET controller chip and issuing an enable transmitter command to that chip.

In state WT_ACK the transmitter state machine is awaiting an acknowledgement to the previously transmitted packet or a Ts timeout. Receipt of a positive acknowledgement indicates successful delivery of the packet, in which case (1) the Ts timer is reset, (2) the outgoing packet's buffer is freed, (3) the value of TXSEQ is incremented by 1, and (4) state WT_PAR is entered.

Receipt of a negative acknowledgement indicates unsuccessful delivery of the packet, in which case state WT_TXOP is entered to cause retransmission of the packet. On stations that support multiple sessions (workstations and RF Bridges), no more than two successive transmission opportunities are to be used to attempt delivery of any given packet before scanning the queue of outgoing packets and attempting delivery of any packets pending from other sessions.

Occurrence of a Ts timeout (while in WT_PAR or WT_ACK states) causes (1) the session in progress (if any) to be terminated, (2) the presentation layer to be informed of the timeout condition, (3) the outgoing packet's buffer to be freed, (4) the value of TXSEQ to be incremented by 1, and (5) state WT_PAR to be entered.

Receiver Control State Machine

Figure 9:
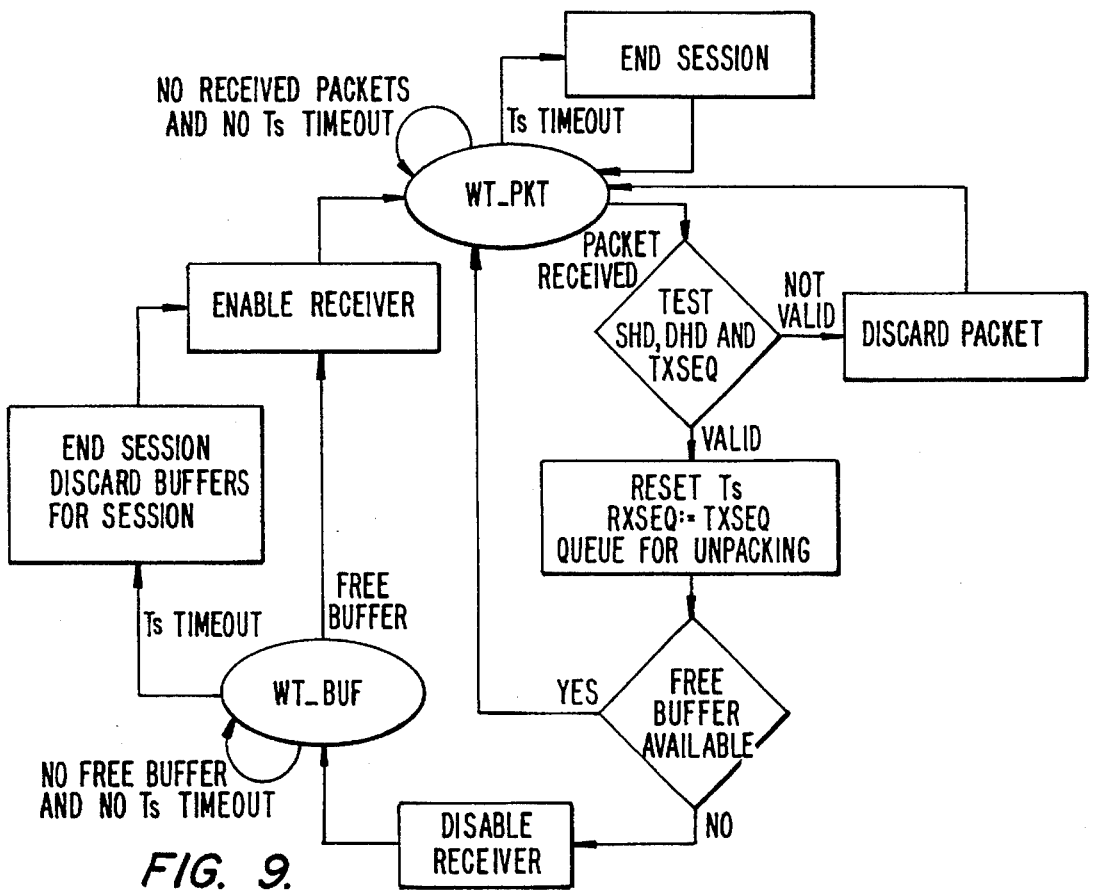
FIG. 9 is a diagram of a receiver state machine.

The receiver state machine shown in FIG. 9 handles all incoming packets for a given partner; validates the Oxinet2 header on received packets; and inhibits the receive function when no free receive buffers are available for additional incoming packets.

Receiver states are

Waiting for Packet (WT_PKT), which is used while waiting for an incoming packet to be received; and Waiting for Buffer (WT_BUF), which is used when all receive buffers are occupied and no further reception is possible until at least one buffer is freed by higher-layer functionality.

One integer value is maintained by the receiver state machine. RXSEQ, which holds the value from the TXSEQ field of the last validly received packet. The low-order of this variable must be the complement of the low-order bit of the TXSEQ field in the next incoming packet for the new packet to be accepted as valid.

The events that can cause state transitions in the receiver state machine include "packet received", which indicates that a packet has been validly received, and positively acknowledged, by the MAC layer functionality of the underlying network;

"free buffer", which indicates that at least one free buffer is available for use by the receiver state machine; and "Ts Timeout", which indicates the expiration of the session timeout interval.

Receiver State Transition Diagram

Operation of the receiver state machine is characterized by the diagram of FIG. 7. A narrative description of operation of this state machine follows:

Upon initialization of a receiver state machine, or upon completion of processing for any packet, state WT_PKT is entered. In state WT_PKT the receiver state machine is idle, awaiting the availability of an incoming parcel from the MAC layer.

If a Ts timeout occurs while in state WT_PKT, the session in progress (if any) is terminated and the state machine remains in state WT_PKT. Upon exit from WT_PKT state due to receipt of a packet, the received packet is validated based on the criteria below. If any of the validation criteria are not met, the packet is discarded and state WT_PKT is reentered. Validation criteria are:

(1) SHD appropriate for session partner (only checked if a session is in progress), (2) STID in the DHD appropriate for this station, (3) SSN in the DHD appropriate for this session if a session is in progress or=0 if no session is in progress, and (4) The value of TXSEQ equal to the value of RXSEQ plus 1 (only checked if a session is in progress).

If the incoming packet is validated, (1) the Ts timer is reset, since the session partner is known to be operating based on the packet just received, (2) the value of TXSEQ from the received packet is saved in RXSEQ, and (3) the packet is queued for unpacking by the presentation layer.

After packet processing, the free buffer queue is checked, and if at least one free receive buffer is available, state WT_PKT is entered, whereas if no free receive buffers are available, the MAC-layer receiver is disabled and state WT_BUF is entered.

In state WT_BUF the receiver state machine is waiting for at least one free receive buffer to become available from higher-layer functionality. This waiting takes place with the MAC-layer receiver disabled, so any transmission attempts to this station will be negatively acknowledged. The implementation of the receiver state machine should minimize the time between a free receive buffer becoming available and the exit from WT_BUF state, in order to minimize the chances for a Ts timeout to occur at the session partner.

If a Ts timeout occurs while in state WT_BUF, the session (if any) is ended and any buffers awaiting processing for this session are discarded prior to exit from WT_BUF state.

Upon exit from WT_BUF state the MAC-layer receiver is reenabled and state WT-PKT is entered.

Action Codes

The network control actions use action codes. Some significant control actions are defined below.

| Action | Symbol | CODE |
|---|---|---|
| Echo Request | ECHO_REQ | FF00h |
| Connect Request | CONN_REQ | FF02h |
| Disconnect Req. | DISC_REQ | FF03h |
| Read EEPROM Req. | RDEE_REQ | FF09h |
| Write EEPROM Req. | WREE_REQ | FF0Ah |
| Status Request | STAT_REQ | FF0Bh |
| Mod. Config. Req. | MCON_REQ | FF0Fh |
| Statistics Req. | STST_REQ | FF10H |
| Echo Reply | ECHO_REP | FF40h |
| Connect Reply | CONN_REP | FF42h |
| Disconnect Reply | DISC_REP | FF43h |
| Read EEPROM Reply | RDEE_REP | FF49h |
| Write EEPROM Rep. | WREE_REP | FF4Ah |
| Status Reply | STAT_REQ | FF4Bh |
| Mod. Config. Req. | MCON_REP | FF4Fh |
| Statistics Rep. | STST_REP | FF50h |

Echo

The echo action is used for response time measurement. Receipt of an ECHO_REQ results in an immediate ECHO_REP without any other processing. This parcel has a maximum-length INFO field to ensure that no other parcels occupy the same packet. The T-bit in the PKTF byte must be set=1 to activate the necessary timestamping of this parcel.

The ECHO action, and packets containing ECHO_REQ and ECHO_REP parcels, are special cases among all network control actions.

The entity gnerating the ECHO_REQ parcel creates a maximum-length INFO field, and initializes the first byte of this field=1. This byte is used as a (0-origin) offset to the next available byte of the INFO field.

Whenever a packet with the T-bit in the PKTF byte=1 enters or leaves a station, a 7-byte report is appended to the end of the INFO field. The first byte of the report is placed at the location indicated by byte 0 of the INFO field. After inserting this report, the value of byte 0 is incremented by 7. This report comprises:

The (3-byte) STID of the station, and the (4-byte) timestamp copied from the local millisecond timer.

The addressed recipient of the ECHO_REQ parcel inserts a 7-byte report when the request is processed (based on the ECHO_REQ ACT value), then copies the INFO field of the request into the INFO field of an ECHO_REP parcel that is immediately sent as the reply (with the T-bit in the PKTF byte=1).

If, at any station attempting to append a 7-byte report to an ECHO_REQ or ECHO_REP INFO field, the addition of these 7 bytes would cause the end_ptr (byte 0) to exceed the end of the INFO field, then the report is not appended and the parcel is sent without modification.

| ECHO_REQ Parcel Info Field: | | |
|---|---|---|
| OFFSET | FIELD | USAGE |
| 0 | end_ptr | Pointer to next available byte (0-origin) |
| 1–225 | | Used to hold timestamp reports |

| ECHO_REP Parcel Info Field: | | |
|---|---|---|
| OFFSET | FIELD | USAGE |
| 0 | end_ptr | Pointer to next available byte (0-origin) |

| ECHO_REP Parcel Info Field: | | |
|---|---|---|
| OFFSET | FIELD | USAGE |
| 1–225 | | Used to hold timestamp reports |

Connect

The connect action establishes a session if the requester is an appropriate partner for the recipient and the recipient has the capacity to create an additional session at the time the request is received. CONN_REQ parcels are sent by session manager services at satellite clusters to session administrator services at workstations. The SSN field in the SHD of the packet that carries the CONN_REQ parcel should be=1 and the SSN field in the DHD should be=0. The session administrator at the workstation assigns the SSN for the satellite to use in the DHD of subsequent packets directed to the workstation during this session, and returns the value to the requester in the SHD of the packet used to carry the CONN_REP parcel.

If a satellite cluster does not receive a CONN_REP within the session timeout interval, or the CONN_REP that is received contains a completion code other than zero (successful) or a rejection code indicating not to retry, the CONN_REQ is repeated up to a total of three times in rapid succession. If a connection has still not been successfully established, the station repeats the CONN_REQ actions once per minute until a session is successfully established. This one minute retry cycle can be overridden by various local actions, such as the activation of an instrument-specific control sequence to cause immediate retry of the connection attempt.

Several parameters about the device sending the CONN_REQ are included in the request parcel for use at the destination in determining whether the request should be granted. If these parameters indicate that the session should not be established (due to incompatible protocol versions, etc.) the request is rejected with the appropriate completion code.

CONN_REQ parcels are never ignored. If the CONN_REQ is received, a CONN_REP is generated whether or not the request is successful. If the completion code field contains any value other than 0, the session has not been successfully established, and the code specifies the reason for failure.

| CONN_REQ Parcel Info Field: | | |
|---|---|---|
| OFFSET | FIELD | USAGE |
| 0–3 | iid | Instrument ID |
| 4 | hw_rev | Hardware revision level |
| 5 | sw_rev | Software revision level |
| 6 | min_prot | Minimum supportable protocol version |
| 7 | max_prot | Maximum supportable protocol version |
| 8 | cur_ssn | Current SSM (= 0 if unconnected) |
| 9–11 | last_stid | STID of last (or current) session partner |
| 12–15 | last_conn | Time last connected |
| 16–19 | time | Current time |
| 20–22 | location | Last known location |
| 23–26 | last_loc | Time location last received |
| 27 | ee_slrc | SLRC of EEPROM |

| CONN_REP Parcel Info Field: | | |
|---|---|---|
| OFFSET | FIELD | USAGE |
| 0 | reason | Reason for successful connection |
| 1–3 | rstid | Replying station's STTD |
| 4 | hw_rev | Hardware revision level |
| 5 | sw_rev | Software revision level |
| 6 | prot_ver | Protocol version to use |

When the CCODE in the CONN_REP parcel header indicates successful completion (zero), byte 0 of the INFO field contains bit-encoded information on the reason for granting this request:

bit 0 is=1 if the request has been granted due to an open adoption (not currently used);

bit 1 is=1 if the replying workstation is this requester's last custodian;

bit 2 is=1 if the requester is in the replying workstation's administrative domain; and bits 3–7 are reserved.

This bit encoding permits CONN_REP parcels received from partners with higher connection priority to be determined by a numerically greater reason value.

Sessions may only be established between partners that can both support a common protocol version. The specific protocol version to use is defined in the prot_ver byte of the CONN_REP parcel.

| CONNECT Completion Codes: | |
|---|---|
| VALUE | USAGE |
| 00h | Successful completion of CONNECT action |
| 04h | Action rejected, no more sessions available at workstation |
| 11h | Unsupported protocol version(s) |
| 12h | Invalid adoption |
| 13h | Incorrect administrative domain |
| 84h | CONNECT action rejected, do not call back |

Disconnect

The disconnect action terminates a session. This action is rejected if no session is in progress. Either session partner can initiate a DISC_REQ. The DISC_REP is the last parcel sent over the session being terminated. If a workstation receives a DISC_REQ with the B-bit in the PKTF byte set=1, the workstation must expunge the route used for the session being disconnected by sending a UNRT_REQ to the appropriate RF bridge.

| DISC_REQ Parcel Info Field: | | |
|---|---|---|
| OFFSET | FIELD | USAGE |
| 0 | reason | Reason for disconnection |
| 1–3 | sstid | Sending station's STID |
| 4–6 | new_stid | STID of new session manager (only valid if handoff) |

Byte 0 of the INFO field contains bit-encoded information on the reason(s) the session is being disconnected:

bit 0 is=1 if the requester has received a CONN_REP from a more appropriate session partner;

bit 1 is=1 if the requesting cluster has obtained a connection that uses a more appropriate source of power;

bit 2 is=1 if the requesting cluster has obtained a connection via a more appropriate network medium;

bit 3 is=1 if the requester has suffered a loss of power or low-battery condition;

bit 4 is=1 if the requester is making this request pursuant to a session manager handoff action (HDOF_REQ);

bit 5 is=1 to indicate an arbitrary disconnection for reasons not listed above; and bits 6–7 are reserved.

| DISC_REP Parcel Info Field: | | |
|---|---|---|
| OFFSET | FIELD | USAGE |
| 0–2 | RSTID | Replying station's STID |

| DISCONNECT Completion Codes: | |
|---|---|
| VALUE | USAGE |
| 00h | Successful completion of DISCONNECT action |
| 03h | Rejected, recipient not in session with requester |

Read EEPROM

The read EEPROM action is used to read out arbitrary portions of the contents of the parameter EEPROM. The relevant portion of EEPROM is identified by a starting address and length. These address and length values are in bytes. The allowable range on the starting address is 0–127, and the allowable range on the length is 1–128, with the restriction that the sum of these two values must not exceed 128.

| RDEE_REQ Parcel Info Field: | | |
|---|---|---|
| OFFSET | FIELD | USAGE |
| 0–2 | dsstid | Must be STID of recipient |
| 3 | eeaddr | Start address in EEPROM |
| 4 | eeln | Length in EEPROM |

| RDEE_REP Parcel Info Field: | | |
|---|---|---|
| OFFSET | FIELD | USAGE |
| 0–2 | rstid | Replying station's STID |
| 3 | ee_slrc | SLRC of EEPROM data |
| 4–132 | eedat | Data read from EEPROM |

| READ EEPROM Completion Codes: | |
|---|---|
| VALUE | USAGE |
| 00h | Successful completion of READ EEPROM action |
| 1Ah | EEPROM SLRC error (data cannot be trusted) |
| 1Bh | Invalid eeaddr + eeln |

Write EEPROM

The write EEPROM action is used to load the contents of arbitrary portions of the parameter EEPROM. The relevant portion of EEPROM is identified by a starting address and length. These address and length values are in bytes. The allowable range on the starting address is 0–127, and the allowable range on the length is 1–128, with the restriction that the sum of these two values must not exceed 128.

The allowable starting addresses for writing to EEPROM are:

0 with a length of 1,

4–63 with a length of 1 to 60, and

68–100 with a length of 1 to 35.

When writing to the vector byte (address 0), only the high-order nibble will be altered during the operation. The low-order nibble is reserved to indicate the offsets into the SLRC and last STID vectors, which are maintained by the system.

In order to protect the contents of EEPROM from inadvertent overwriting, the preexisting EEPROM SLRC value must be specified in the WREE_REQ parcel info field. If this value does not match the actual EEPROM SLRC value the action is rejected without altering the contents of EEPROM. In addition, bytes 124–127 of EEPROM, which contain the STID, cannot be over-written by this action. An attempt to change the value of any of these 4 bytes in EEPROM will have no effect on the values stored therein, and the condition will be indicated through the resulting read-after-write error.

In order to minimize the number of EEPROM write cycles, a read-before-write is performed on each byte, and the write is performed only if the new data is different from the data that is already stored in the location. If an EEPROM write is performed, then the new data is validated by a read-after-write.

| WREE_REQ Parcel Info Field: | | |
|---|---|---|
| OFFSET | FIELD | USAGE |
| 0–2 | | Must be STID of recipient |
| 3 | eeaddr | Start address in EEPROM |
| 4 | eelen | Length in EEPROM |
| 5 | old_slrc | Existing EEPROM SLRC |
| 6–133 | newdat | New values to store into EEPROM |

| WREE_REP Parcel Info Field: | | |
|---|---|---|
| OFFSET | FIELD | USAGE |
| 0–2 | rstid | Replying station's STID |
| 3 | ee_slrc | (New) SLRC of EEPROM |

| WRITE EEPROM Completion Codes: | |
|---|---|
| VALUE | USAGE |
| 00h | Successful completion of WRITE EEPROM action |
| 1Ah | EEPROM SLRC error (data cannot be trusted) |
| 1Bh | Invalid eeaddr + eeln |
| 1Ch | Invalid old_slrc, write not performed |
| 1Dh | Read-after-write failure (data cannot be trusted) |

Status

The status action allows the requester to determine various status conditions pertaining to the replier.

| STAT_REQ Parcel Info Field: | | |
|---|---|---|
| OFFSET | FIELD | USAGE |
| {INFO field is not used} | | |

| STAT_REP Parcel Info Field: | | |
|---|---|---|
| OFFSET | FIELD | USAGE |
| 0–2 | rstid | Replying station's STID |

STAT_REP Parcel Info Field:

| OFFSET | FIELD | USAGE |
|---|---|---|
| 3–6 | rsiid | Replying station's IID |
| 7–10 | timest | Current timestamp |
| 11–14 | sv_timest | Saved timestamp |
| 15 | post | Power-on self-test status (0 = no errors) |
| 16 | cum_post | Logical-OR of POST results from Gw or SM |
| 17 | ee_slrc | SLRC of EEPROM data |
| 18 | connst | Connection status (0 = not in session) |
| 19 | gatest | Gateway status (0 = network not available) |
| 20 | locst | Location status (0 = not located) |
| 21–23 | irloc | Last known IR location |
| 24–27 | loc_time | Timestamp when location last received |
| 28 | inst_ct | Number of instruments in table (only relevant from session manager) |

NOTE:
All counters and saved timestamps are reset to zero at power-on rest. The current timestamp is set at power-on rest from the persistent time sense facility, if present, or is set to zero if no time sense is available.

STATUS Completion Codes:

| VALUE | USAGE |
|---|---|
| 00h | Successful completion of STATUS action |

Module Configuration

The module configuration action is used by the instrument gateway during instrument initialization to determine the necessary information to build the local service table and initialize the trend buffers.

MCON_REQ Parcel Info Field:

| OFFSET | FIELD | USAGE |
|---|---|---|
| {INFO field is not used} | | |

MCON_REP Parcel Info Field:

| OFFSET | FIELD | USAGE |
|---|---|---|
| 0–2 | rstid | Replying station's STID |
| 3–6 | rsiid | Replying station's IID |
| 7 | post | Power-on self-test status (0 = no errors) |
| 8 | gwstat | Gateway status (see HDOF_REQ) |
| 9 | trends | Number of trend bytes reported each 10 sec. |
| 10 | tr_src | Type of time reference source |
| 11 | tr_dst | Type of time reference destination |
| 12 | services | Number of local services (1–15) |
| 13–27 | | List of local service names |

MODULE CONFIGURATION Completion Codes:

| VALUE | USAGE |
|---|---|
| 00h | Successful completion of MODULE CONFIGURATION action |

Statistics

The statistics action is used to determine various operation statistics pertaining to the replier.

STST_REQ Parcel Info Field:

| OFFSET | FIELD | USAGE |
|---|---|---|
| {INFO field is not used} | | |

STST-REP Parcel Info Field:

| OFFSET | FIELD | USAGE |
|---|---|---|
| 0–2 | rstid | Replying station's STID |
| 3–6 | rsiid | Replying station's IID |
| 7–10 | timest | Current timestamp |
| 11–14 | sv_timest | Saved timestamp |
| 15–18 | tx_pcl | Number of parcels transmitted |
| 19–22 | tx_pkt | Number of packets transmitted |
| 23–26 | tx_byte | Number of bytes transmitted |
| 27–30 | null_dst | Number of nonexistent destinations |
| 31–34 | blk_rcv | Number of blocked receivers |
| 35–38 | rx_pcl | Number of parcels received |
| 39–42 | rx_pkt | Number of packets received |
| 43–46 | rx_byte | Number of bytes received |
| 47–50 | disc_pcl | Number of parcels discarded |
| 51–54 | disc_pkt | Number of packets discarded |
| 55–58 | disc_byte | Number of bytes discarded |
| 59–62 | bad_fr | Number of invalid frames |
| 63–66 | recons | Total number of reconfigurations |
| 67–70 | my_recons | Number of reconfigurations from the station |
| 71–74 | corr | Number of packets with ECC errors corrected |
| 75–78 | uncorr | Number of packets with uncorrectable ECC errors |

STATISTICS Completion Codes:

| VALUE | USAGE |
|---|---|
| 00h | Successful completion of STATISTICS action |

As will be understood by those familiar with the art, the present invention may be embodied in other specific forms without departing from the spirit or essential characteristics thereof. For example, the number and location of the bytes in the headers could be varied. Accordingly, the disclosure of the preferred embodiment of the invention is intended to be illustrated, but not limiting, of the scope of the invention, which will be set forth in the following claims.

What is claimed is:

1. A network having a plurality of nodes coupled together over a communication medium, comprising:

at least first and second nodes coupled to said communication medium;

a plurality of virtual services associated with at least one device coupled to said first node;

means, associated with said virtual services, for creating parcels containing an information field and a virtual destination service header;

service table means, at said first node, for storing a physical address corresponding to a virtual destination service address;

means, at said first node, for transmitting said parcels over said communication medium to said physical address;

means, at said second node, for receiving said parcels from said communications medium; and means, at said second node, for directing each of said parcels to the virtual destination service specified in said virtual destination service header;

wherein each parcel includes a parcel header comprising:
a source tag byte with a first range of values identifying instruments and a second range of values identifying workstation-based functions;
a parcel information length byte indicating the length of said information field;
a parcel flag byte for indicating a kind of action conveyed in said information field, a type of addressing used and a precedence level;
an originator service identifier byte indicating a source virtual service;
a recipient service identifier byte indicating a designation virtual service; and
a pair of action code bytes indicating an action to be taken in processing said information field at an application layer in said destination virtual service.

2. A network having a plurality of nodes coupled together over a communication medium, comprising:
at least first and second nodes coupled to said communication medium;
a plurality of virtual services associated with at least one device coupled to said first node;
means, associated with said virtual services, for creating parcels containing an information field and a virtual destination service header;
service table means, at said first node, for storing a physical address corresponding to a virtual destination service address;
means, at said first node, for transmitting said parcels over said communication medium to said physical address;
means, at said second node, for receiving said parcels from said communications medium; and
means, at said second node, for directing each of said parcels to the virtual destination service specified in said virtual destination service header;
wherein each parcel includes a parcel header comprising:
a source tag byte with a first range of values identifying instruments and a second range of values identifying workstation-based functions;
a destination tag byte with said first range of values identifying instruments and said second rang of values identifying said workstation-based functions;
a parcel information length byte indicating the length of said information field;
a parcel flag byte for indicating a kind of action conveyed in said information field, a type of addressing used and a precedence level;
an originator service identifier byte indicating a source virtual service;
a recipient service identifier byte indicating a designation virtual service; and
a pair of action code bytes indicating an action to be taken in processing said information field at an application layer in said destination virtual service; and
wherein said information field contains one of data, a request action, and a reply to a request action, said parcel header further comprising:
a completion code byte indicating the status of said requested action.

3. A network having a plurality of nodes coupled together over a communication medium, comprising:
at least first and second nodes coupled to said communication medium;
a plurality of virtual services associated with at least one device coupled to said first node;
means, associated with said virtual services, for creating parcels containing an information field and a virtual destination service header;
service table means, at said first node, for storing a physical address corresponding to a virtual destination service address;
means, at said first node, for transmitting said parcels over said communication medium to said physical address;
means, at said second node, for receiving said parcels from said communications medium; and
means, at said second node, for directing each of said parcels to the virtual destination service specified in said virtual destination service header;
wherein each parcel includes a parcel header comprising:
a source tag byte with a first range of values identifying instruments and a second range of values identifying workstation-based functions;
a destination tag byte with said first range of values identifying instruments and said second range of values identifying said workstation-based functions;
a parcel information length byte indicating the length of said information field;
a parcel flag byte for indicating a kind of action conveyed in said information field, a type of addressing used and a precedence level;
an originator service identifier byte indicating a source virtual service;
a recipient service identifier byte indicating a designation virtual service; and
a pair of action code bytes indicating an action to be taken in processing said information field at an application layer in said destination virtual service; and
wherein, said information field contains data, said parcel header further comprises an application sequence number byte indicating an order in which said parcel was generated.

4. A network having a plurality of nodes coupled together over a communication medium, comprising:
at least first and second nodes coupled to said communication medium;
a plurality of virtual services associated with at least one device coupled to said first node;
means, at said first node, for receiving and temporarily storing a plurality of parcels from said virtual services, each parcel containing a parcel information field and a virtual address header;
means, at said first node, for multiplexing said plurality of parcels into a single packet, said single packet having a packet header, with said plurality of parcels being in a packet information field of said single packet;
means, at said first node, for transmitting said single packet over said communication medium during a single session;
means, at said second node, for receiving said single packet from said communications medium;
means, at said second node, for demultiplexing said received packet into a plurality of parcels; and
means, at said second node, for directing each of said parcels to the virtual address specified in said virtual address header information;
wherein virtual address header comprises:

a source tag byte with a first range of values identifying instruments and a second range of values identifying workstation-based functions;

a destination tag byte with said first range of values identifying instruments and said second range of values identifying said workstation-based functions;

a parcel information length byte indicating the length of said parcel information field;

a parcel flag byte for indicating a kind of action conveyed in said parcel information field, a type of addressing used and a precedence level;

an originator service identifier byte indicating a source virtual service;

a recipient service identifier byte indicating a destination virtual service; and a pair of action code bytes indicating an action to be taken in processing said parcel information field at an application layer in said destination virtual service.

5. A gateway for coupling an instrument to a network comprising:

means for receiving and temporarily storing a plurality of parcels from at least one virtual service in said instrument, each parcel containing a parcel information field and a virtual address header;

means for multiplexing said plurality of parcels into a single packet, said single packet having a packet header and a packet information field, said packet information field containing said plurality of parcels;

means for transmitting said single packet over said network during a single session; and means for constructing said packet header to comprise:
four source handle bytes including three station ID bytes identifying said gateway and a first session number byte;
four destination handle bytes including three station ID bytes identifying a destination gateway and a second session number byte;
a transmitter sequence number byte identifying said packet;
a packet flag byte indicating whether there have been any errors or any reconfiguration;
an information length byte indicating the length of said packet information field; and
a parcel count byte indicating the number of parcels in said packet information field.

6. A gateway for coupling an instrument to a network comprising:

means for receiving and temporarily storing a plurality of parcels from at least one virtual service in said instrument, each parcel containing a parcel information field and a virtual address header;

means for multiplexing said plurality of parcels into a single packet, said single packet having a packet header and a packet information field, said packet information field containing said plurality of parcels;

means for transmitting said single packet over said network during a single session; and means for constructing said virtual address header to comprise:
a source tag byte with a first range of values identifying instruments and a second range of values identifying workstation-based functions;
a destination tag byte with said first range of values identifying instruments and said second range of values identifying said portion of a computer connected to said first node;
a parcel information length byte indicating the length of said parcel information field;
a parcel flag byte for indicating a kind of action conveyed in said parcel information field, a type of addressing used and a precedence level;
an originator service identifier byte indicating a source virtual service;
a recipient service identifier byte indicating a destination virtual service; and
a pair of action code bytes indicating an action to be taken in processing said parcel information field at an application layer in said destination virtual service;

wherein said virtual address header contains presentation layer header information and said packet header contains network, transport and session address headers.

7. A network having a plurality of nodes coupled together over a communication medium, comprising:

at least first and second nodes coupled to said communication medium;

a plurality of virtual services associated with at least one device coupled to said first node;

means, at said first node, for receiving and temporarily storing a plurality of parcels from said virtual services, each parcel containing a parcel information field and a virtual address header;

means, at said first node, for multiplexing said plurality of parcels into a single packet, said single packet comprising a packet header and a packet information field, with said plurality of parcels being in said packet information field of said single packet;

means, at said first node, for transmitting said single packet over said communication medium during a single session;

means, at said second node, for receiving said single packet from said communications medium;

means, at said second node, for demultiplexing said received packet into a plurality of parcels; and means, at said second node, for directing each of said parcels to the virtual address specified in said virtual address header information;

wherein said virtual address header comprises:
a source tag byte with a first range of values identifying instruments and a second range of values identifying workstation-based functions;
a destination tag byte with said first range of values identifying instruments and said second range of values identifying said workstation-based functions;
a parcel information length byte indicating the length of said parcel information field;
a parcel flag byte for indicating a kind of action conveyed in said parcel information field, a type of addressing used and a precedence level;
an originator service identifier byte indicating a source virtual service;
a recipient service identifier byte indicating a destination virtual service; and
a pair of action code bytes indicating an action to be taken in processing said parcel information field at an application layer in said destination virtual service.

8. A network having a plurality of nodes coupled together over a communication medium, comprising:

at least first and second nodes coupled to said communication medium;

a plurality of virtual services associated with at least one medical device coupled to said first node;

means, associated with said virtual services, for creating parcels containing an information field and a virtual destination service header;

service table means, at said first node, for storing a physical address corresponding to said virtual destination service address;

means, at said first node, for transmitting said parcels over said communication medium to said physical address;

means, at said second node, for receiving said parcels from said communications medium; and means, at said second node, for directing each of said parcels to the virtual destination service specified in said virtual destination service header;

wherein each of said parcels includes a parcel header comprising:

a source tag byte with a first range of values identifying instruments and a second range of values identifying workstation-based functions;

a destination tag byte with said first range of values identifying instruments and said second range of values identifying said workstation-based functions;

a parcel information length byte indicating the length of said information field;

a parcel flag byte for indicating a kind of action conveyed in said information field, a type of addressing used and a precedence level;

an originator service identifier byte indicating a source virtual service;

a recipient service identifier byte indicating a designation virtual service; and a pair of action code bytes indicating an action to be taken in processing said information field at an application layer in said destination virtual service.

9. The network of claim 8 wherein said information field contains one of data, a request action, and a reply to a request action, said parcel header further comprising:

a completion code byte indicating the status of said requested action.

10. The network of claim 8 wherein, when said information field contains data, said parcel header further comprises an application sequence number byte indicating an order in which said parcel was generated.

11. A gateway for coupling an instrument to a network comprising:

means for receiving and temporarily storing a plurality of parcels from at least one virtual service in said instrument, each parcel containing a parcel information field and a virtual address header;

means for multiplexing said plurality of parcels into a single packet, said single packet comprising a packet header and a packet information field, said packet information field containing said plurality of parcels;

means for transmitting said single packet over said network during a single session; and means for constructing said packet header to comprise:

four source handle bytes including three station ID bytes identifying said gateway and a first session number byte;

four destination handle bytes including three station ID bytes identifying a destination gateway and a second session number byte;

a transmitter sequence number byte identifying said packet;

a packet flag byte indicating whether there have been any errors or any reconfiguration;

an information length byte indicating the length of said packet information field; and a parcel count byte indicating the number of parcels ins aid packet information field.

12. A gateway for coupling an instrument to a network comprising:

means for receiving and temporarily storing a plurality of parcels from at least one virtual service in said instrument, each parcel containing a parcel information field and a virtual address header;

means for multiplexing said plurality of parcels into a single packet, said single packet comprising a packet header and a packet information field, said packet information field containing said plurality of parcels;

means for transmitting said single packet over said network during a single session; and means for constructing said virtual address header to comprise:

a source tag byte with a first range of values identifying instruments and a second range of values identifying workstation-based functions;

a destination tag byte with said first range of values identifying instruments and said second range of values identifying said workstation-based functions;

a parcel information length byte indicating the length of said parcel information field;

a parcel flag byte for indicating a kind of action conveyed in said parcel information field, a type of addressing used and a precedence level;

an originator service identifier byte indicating a source virtual service;

a recipient service identifier byte indicating a destination virtual service; and a pair of action code bytes indicating an action to be taken in processing said parcel information field at an application layer in said destination virtual service;

wherein said virtual address header contains presentation layer header information and said packet header contains network, transport and session address headers.

* * * * *